US012264520B2

(12) United States Patent
Gomes et al.

(10) Patent No.: US 12,264,520 B2
(45) Date of Patent: Apr. 1, 2025

(54) ANTI-LIGATURE HINGE

(71) Applicant: ASSA ABLOY Accessories and Door Controls Group, Inc., Monroe, NC (US)

(72) Inventors: Danilo Favero Gomes, Germantown, TN (US); Betty Kay Ward, Memphis, TN (US)

(73) Assignee: ASSA ABLOY Accessories and Door Controls Group, Inc., Monroe, NC (US)

( * ) Notice: Subject to any disclaimer, the term of this patent is extended or adjusted under 35 U.S.C. 154(b) by 29 days.

(21) Appl. No.: 18/125,964

(22) Filed: Mar. 24, 2023

(65) Prior Publication Data

US 2023/0323715 A1 Oct. 12, 2023

Related U.S. Application Data

(60) Provisional application No. 63/328,865, filed on Apr. 8, 2022.

(51) Int. Cl.
*E05D 11/00* (2006.01)

(52) U.S. Cl.
CPC .. *E05D 11/0054* (2013.01); *E05D 2011/0072* (2013.01); *E05Y 2800/424* (2013.01)

(58) Field of Classification Search
CPC ......... E05D 11/0054; E05D 2011/0072; E05D 5/04; E05D 5/10; E05D 2005/106; E05Y 2800/424
See application file for complete search history.

(56) References Cited

U.S. PATENT DOCUMENTS 73,120 A * 1/1868 Reiber ...................... E05D 3/02 16/386
2,047,909 A * 7/1936 North ........................ E05D 3/02 16/250

(Continued)

FOREIGN PATENT DOCUMENTS

DE 20017814 U1 4/2001
EP 4435222 A1 * 9/2024 ............... E05D 3/02

(Continued)

OTHER PUBLICATIONS

Assa Abloy Accessories and Door Controls Group, Inc., United Kingdom Patent Application No. GB2305117.0, Search Report, Oct. 3, 2023.

(Continued)

*Primary Examiner* — Jeffrey O'Brien
(74) *Attorney, Agent, or Firm* — Moore & Van Allen PLLC; Jeffrey R. Gray

(57) ABSTRACT

An anti-ligature door system that utilizes an anti-ligature hinge to operatively couple the door to the door frame. The anti-ligature hinge has an assembled leaf portion formed from a pair of leaves that are operatively coupled together using one or more pins. The anti-ligature cap that is operatively coupled to the leaf portion has a body with one or more projections extending therefrom. The one or more projections may comprise a leaf projection that is configured to be located between the first leaf and the second leaf and operatively coupled to the first leaf or the second leaf. The one or more projections may further comprise a knuckle projection that is configured to be operatively coupled to a knuckle of the first leaf or the second leaf, such as by being inserted into a knuckle aperture formed by the inner surface of the knuckle.

19 Claims, 24 Drawing Sheets

(56) References Cited

U.S. PATENT DOCUMENTS

| | | | | | |
|---|---|---|---|---|---|
| 3,015,126 | A * | 1/1962 | Ahlgren | E05D 5/127 16/385 |
| 3,206,792 | A * | 9/1965 | Beck | E05D 7/10 16/250 |
| 3,375,546 | A | 4/1968 | Peterson | |
| 3,431,590 | A * | 3/1969 | Anderson | E05D 11/00 16/385 |
| 3,621,512 | A * | 11/1971 | Johnson | E05D 5/128 16/380 |
| 6,883,205 | B2 * | 4/2005 | Martinez-Munoz | E05D 11/0054 16/250 |
| 8,613,162 | B2 | 12/2013 | Keller | |
| 8,898,861 | B2 | 12/2014 | Schau | |
| 9,080,378 | B2 | 7/2015 | Keller | |
| RE46,240 | E * | 12/2016 | Schau | E05D 11/0054 |
| 10,385,598 | B2 * | 8/2019 | Shah | E05D 3/122 |
| 10,633,899 | B2 * | 4/2020 | Eshuis | E05D 7/0423 |
| 11,002,050 | B1 * | 5/2021 | Wolthuis | E05D 7/009 |
| 11,346,139 | B1 * | 5/2022 | Dole, Jr. | E05D 11/0054 |
| 11,542,737 | B1 * | 1/2023 | Shields | E05D 3/122 |
| 11,708,713 | B2 * | 7/2023 | Colligan | E05D 15/54 49/177 |
| 2011/0030168 | A1 * | 2/2011 | Schau | E05D 11/0054 16/82 |
| 2013/0000203 | A1 * | 1/2013 | Platt | E05D 11/00 49/246 |
| 2021/0127832 | A1 | 5/2021 | Shahzad | |
| 2022/0282565 | A1 * | 9/2022 | Colligan | E05F 1/063 |
| 2024/0318497 | A1 * | 9/2024 | Colligan | E05D 3/02 |

FOREIGN PATENT DOCUMENTS

| | | | |
|---|---|---|---|
| GB | 2516093 | A | 1/2015 |
| GB | 2534513 | A | 7/2016 |
| GB | 2539135 | A | 12/2016 |
| GB | 2570033 | A | 7/2019 |
| KR | 101709447 | B1 | 2/2017 |

OTHER PUBLICATIONS

Architectural Builders Hardware Manufacturing Inc., AC500 Stainless Steel Pin & Barrel Hinge, 1 page.

* cited by examiner

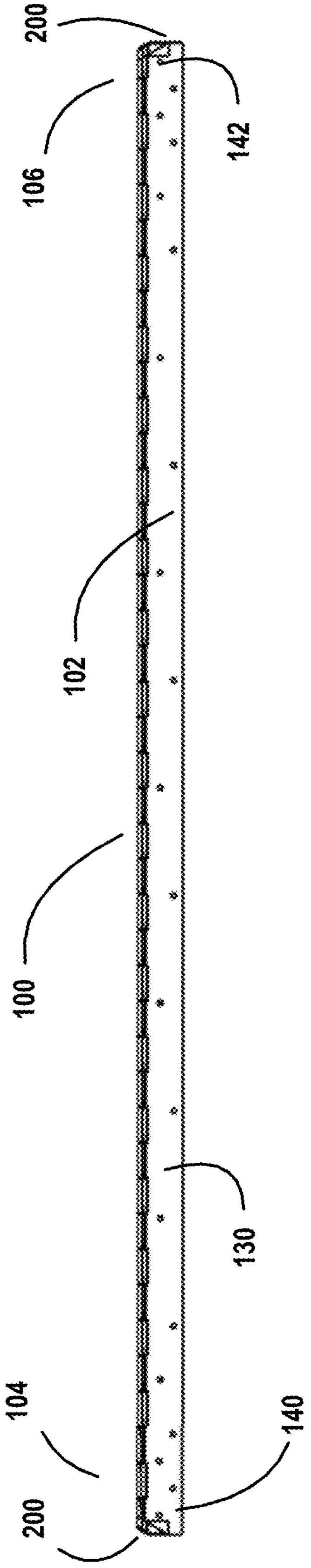
*FIG.* 1B
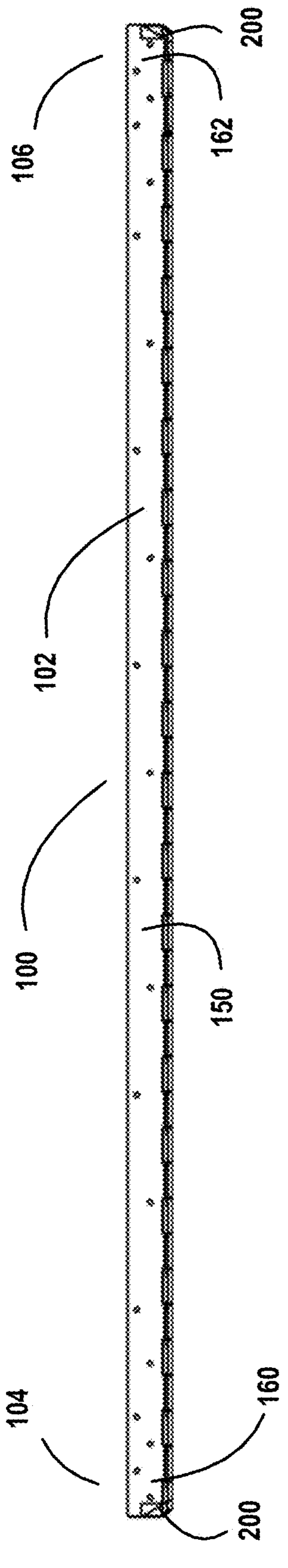
*FIG.* 1C

*FIG.* 6

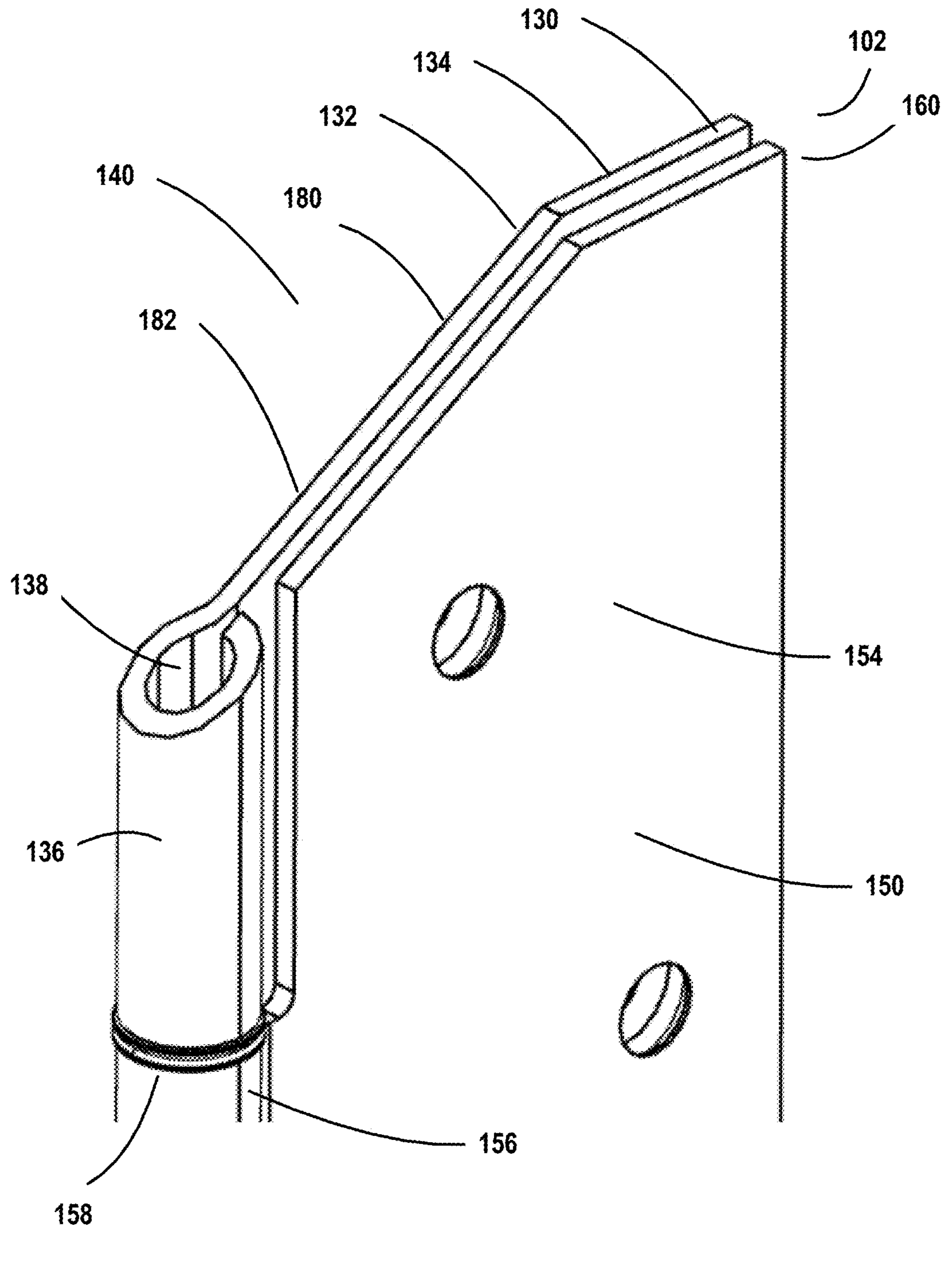
*FIG.* 8A

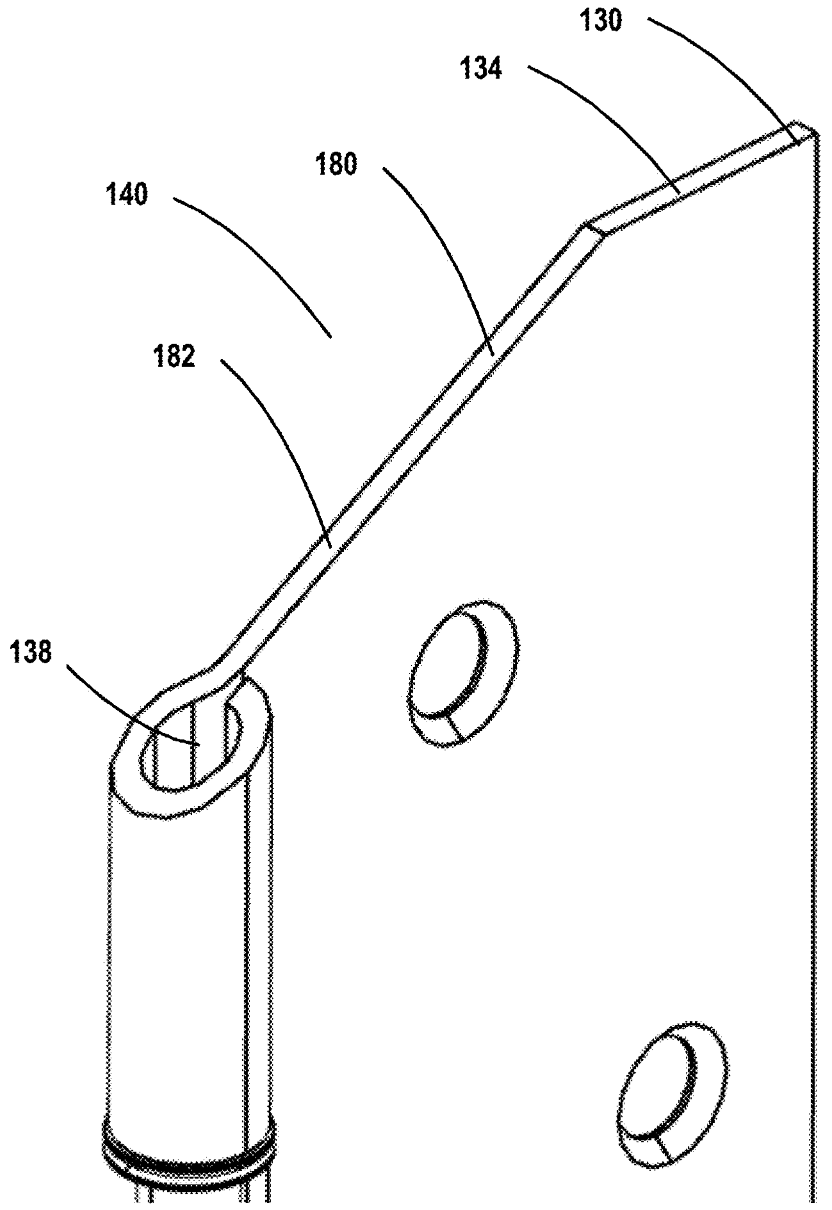
*FIG.* 8B

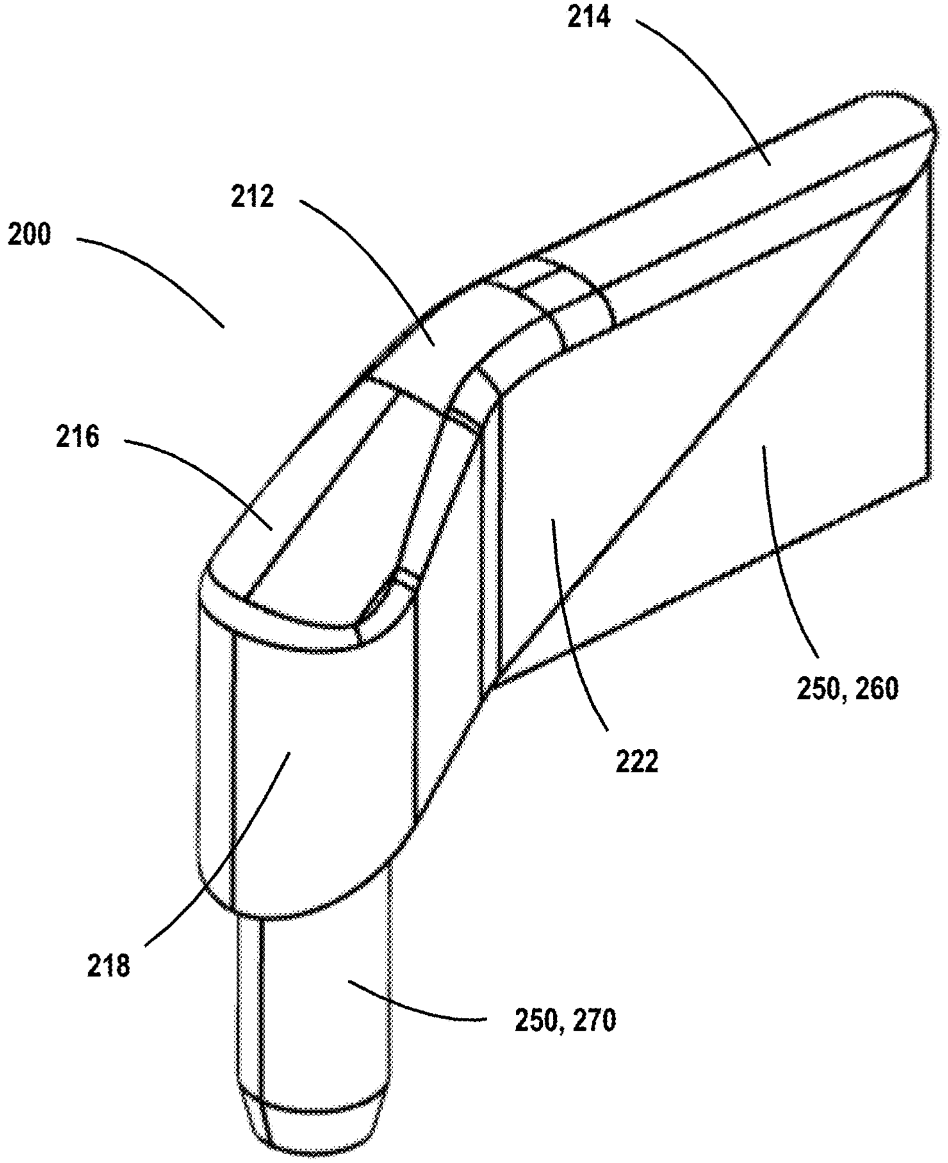
*FIG.* 9

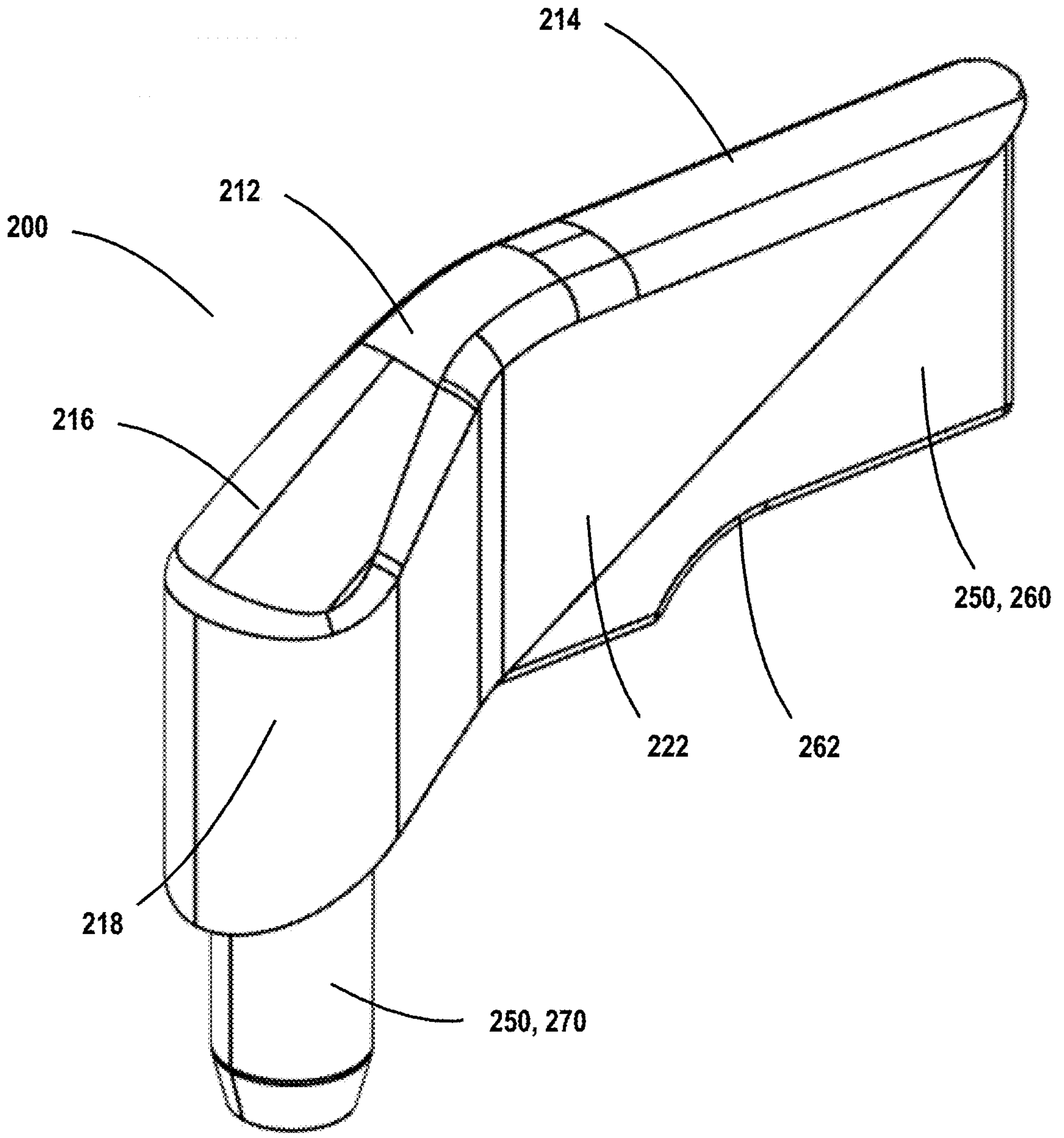
*FIG.* 13

*FIG.* 16A
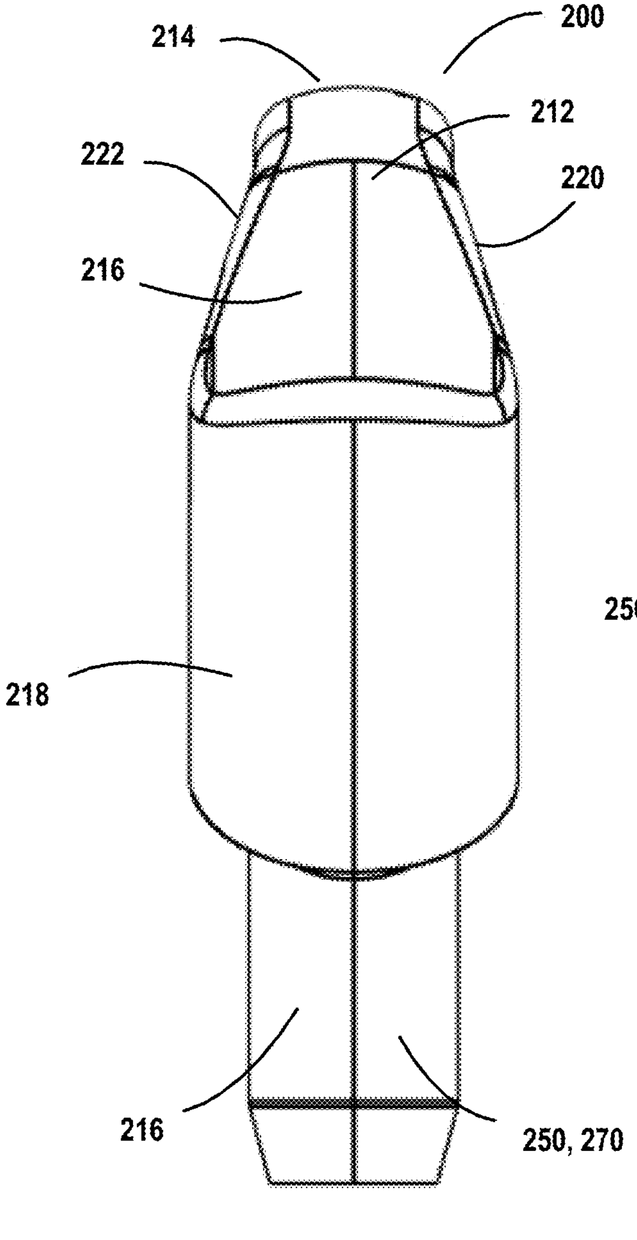
*FIG.* 16B
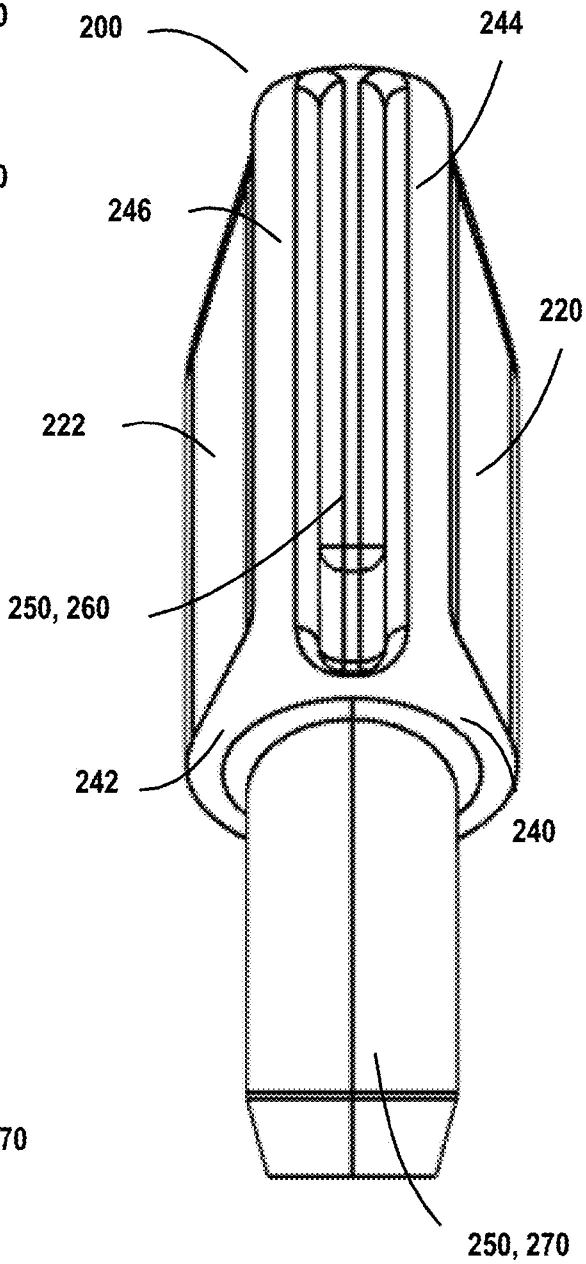

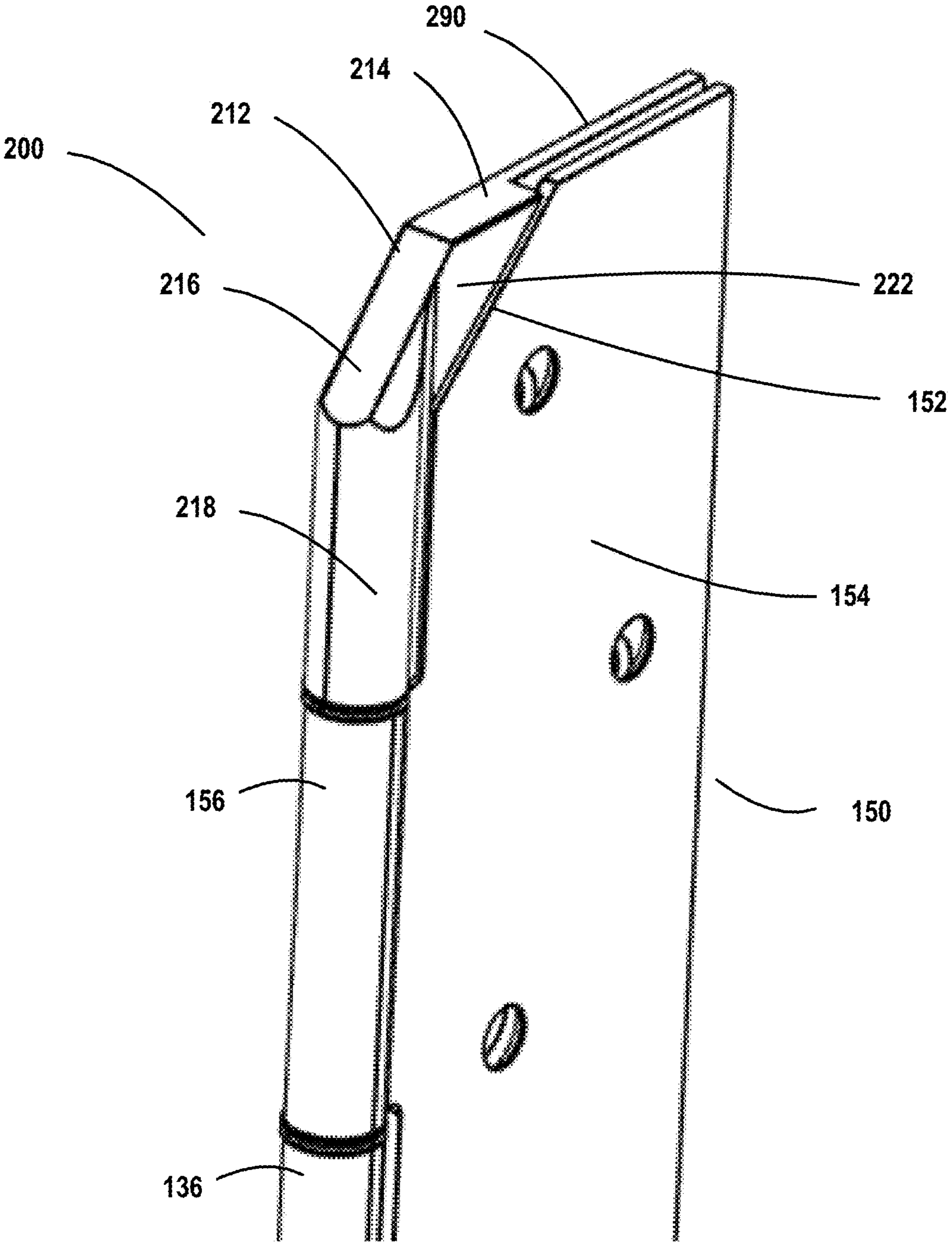
*FIG.* 20A

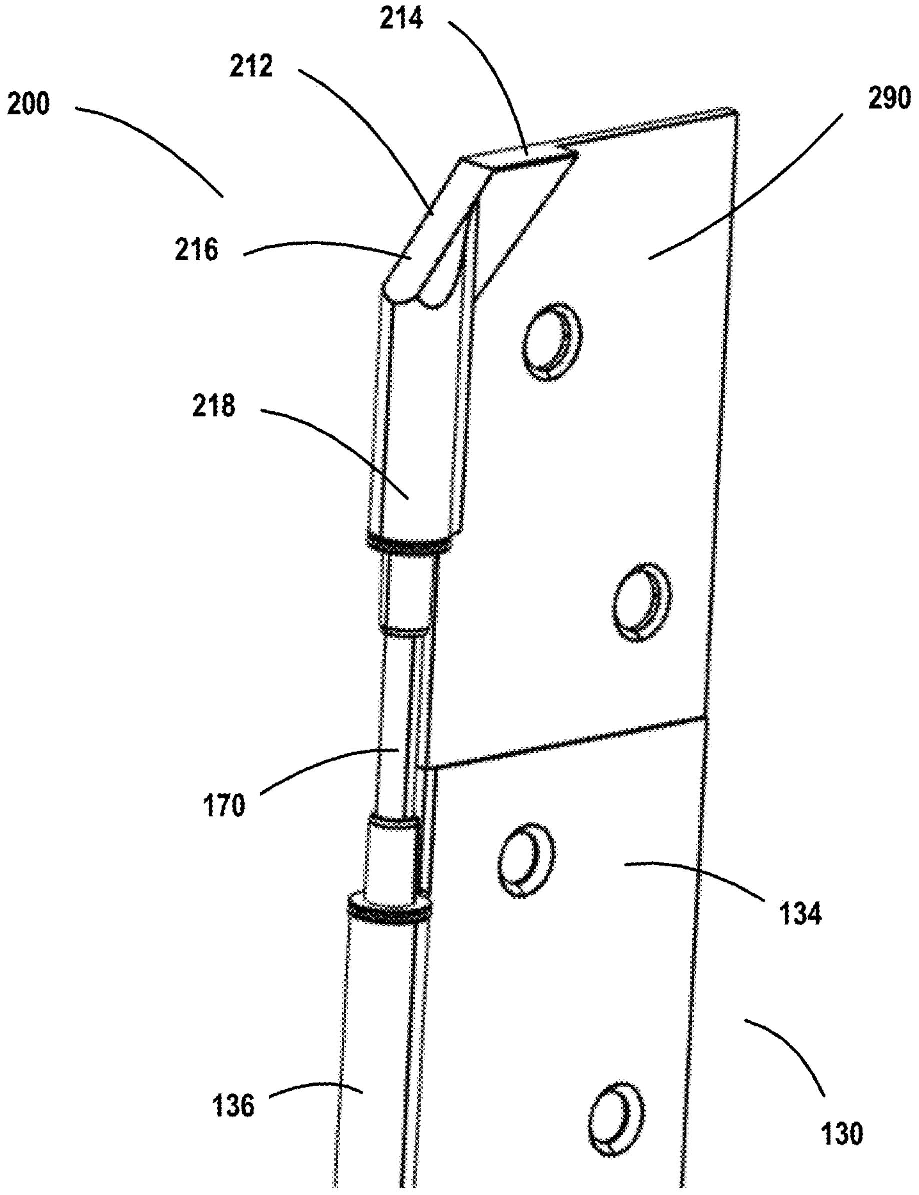
*FIG.* 20B

ANTI-LIGATURE HINGE

CROSS REFERENCE AND PRIORITY CLAIM UNDER 35 U.S.C. § 119

The present Application for a Patent claims priority to U.S. Provisional Patent Application Ser. No. 63/328,865 entitled "Anti-Ligature Hinge," filed on Apr. 8, 2022 and assigned to the assignees hereof and hereby expressly incorporated by reference herein.

FIELD

The present disclosure generally relates to anti-ligature hinges, and in particular a hinge cap for the anti-ligature hinge that has improved anti-ligature features.

BACKGROUND

Facilities, including medical facilities may require the use of anti-ligature products in order to protect users (e.g., patients, or the like) at the facility (e.g., visiting, outpatient, in-patient, residents, or the like). Traditional door hinges may include ligature features on which a user could be harmed. Products, including door hinges, may be improved through the use of anti-ligature products.

SUMMARY

Embodiments of the disclosure relate to an anti-ligature door system that utilizes an anti-ligature hinge to operatively couple the door to the door frame. The anti-ligature hinge may comprise an assembled leaf portion comprising a pair of leaves that are operatively coupled together using one or more hinge pins. The leaf portion may comprise an upper end (e.g., proximal end, or the like) and a lower end (e.g., a distal end, or the like). The anti-ligature hinge may be a continuous hinge, and as such may span the entire height, or a majority thereof, of the door and/or door frame. The anti-ligature hinge may comprise at least one anti-ligature cap that is operatively coupled to the upper end and/or the lower end of the assembled leaf portion. As such, in some embodiments an anti-ligature cap may be operatively coupled to both the upper end and lower end of the assembled leaf portion of the anti-ligature hinge.

The anti-ligature cap may comprise a body with one or more projections. The one or more projections may comprise a leaf projection (otherwise described as a web projection) that is configured to be located between the first leaf and the second leaf and operatively coupled to the first leaf or the second leaf. The one or more projections may further comprise a knuckle projection (otherwise described as pin projection), which is configured to be operatively coupled to a knuckle of the first leaf or the second leaf, such as by being inserted into a knuckle aperture formed by the inner surface of the knuckle. The one or more projections may be operatively coupled to the first leaf and/or the second leaf through the use of a connector (e.g., weld, fastener, crimping, button punch, interference fit, or the like). The body of the anti-ligature cap may be shaped such that it does not include any sharp edges and may be angled downwardly such that objects cannot be hung on the surfaces of the anti-ligature cap. Moreover, when installed the anti-ligature cap may be flush with the leaf portion of the hinge.

One embodiment of the present disclosure is an anti-ligature hinge. The anti-ligature hinge comprises a first leaf, a second leaf operatively coupled to the first leaf, and an anti-ligature cap. The anti-ligature cap comprises a body and one or more cap projections operatively coupled to the body or one or more cap recesses formed by the body. The one or more cap projections or the one or more cap recesses are operatively coupled to the first leaf or the second leaf.

In further accord with embodiments, the anti-ligature cap comprises the one or more cap projections, and wherein the one or more cap projections comprise a leaf projection, wherein the leaf projection extends between the first leaf and the second leaf and is operatively coupled to the first leaf or the second leaf through a leaf projection connector.

In other embodiments, the leaf projection connector comprises a weld, a fastener, or a crimped connector.

In still other embodiments, the first leaf and the second leaf comprise a web, and a plurality of knuckles having apertures therethrough. A pin operatively couples the first leaf and the second leaf through the plurality of knuckles of the first leaf and the second leaf.

In yet other embodiments, the anti-ligature cap comprises the one or more cap projections, and wherein the one or more cap projections comprise a knuckle projection, wherein the knuckle projection extends into at least one knuckle of the plurality of knuckles of the first leaf or the second leaf.

In other embodiments, the anti-ligature cap comprises the one or more cap recesses formed by the body, wherein the one or more cap recesses are configured to receive one or more hinge projections operatively coupled to the first leaf or the second leaf.

In further accord with embodiments, the first leaf or the second leaf have an upper end with a notched section.

In other embodiments, the notched section comprises a beveled surface that extends from a knuckle of the first leaf or the second leaf and into at least a portion of the upper end of the first leaf or the second leaf.

In still other embodiments, the beveled surface has an angle from the horizontal plane of an upper door edge that ranges from 10 to 80 degrees, inclusive.

In yet other embodiments, the body of the anti-ligature cap comprises a bottom surface. The one or more cap projections extend from the bottom surface of the body, or the one or more cap recesses are formed within the bottom surface of the body. At least a portion of the bottom surface engages with the notched section.

In further accord with embodiments, the body of the anti-ligature cap comprises a top surface comprising of an exposed portion and a frame portion. The frame portion is located within a door frame when the anti-ligature hinge is installed.

In other embodiments, the exposed portion diverges from the frame portion outwardly and downwardly from a horizontal plane of the frame portion.

In yet other embodiments, the exposed portion diverges from the frame portion at an anti-ligature angle from the horizontal plane of the frame portion that ranges from 10 to 80 degrees, inclusive.

In still other embodiments, the body of the anti-ligature cap comprises a first side cap surface and a second side cap surface. The first side cap surface is flush with a first outer surface of the first leaf and the second side cap surface is flush with a second outer surface of the second leaf.

In other embodiments, the anti-ligature cap is a cast anti-ligature cap.

In still other embodiments, the anti-ligature hinge is a continuous anti-ligature hinge.

Another embodiment of the present disclosure is a door system. The door system comprises a door, a door frame, and an anti-ligature hinge. Th anti-ligature hinge comprises a first leaf, a second leaf operatively coupled to the first leaf, and an anti-ligature cap. The anti-ligature cap comprises a body and one or more cap projections operatively coupled to the body, or one or more cap recesses formed by the body. The one or more cap projections or the one or more cap recesses are operatively coupled to the first leaf or the second leaf.

In further accord with embodiments, the anti-ligature cap comprises the one or more cap projections, and wherein the one or more cap projections comprise a leaf projection, wherein the leaf projection extends between the first leaf and the second leaf and is operatively coupled to the first leaf or the second leaf through a leaf projection connector.

In other embodiments, the anti-ligature cap comprises the one or more cap projections, and wherein the one or more cap projections comprise a knuckle projection, wherein the knuckle projection extends into at least one knuckle of a plurality of knuckles of the first leaf or the second leaf.

Another embodiment of the present disclosure comprises a method of installing an anti-ligature hinge. The method comprises assembling one of a first leaf or one of a second leaf to a door frame, assembling another of the first leaf or the second leaf to a door, and assembling an anti-ligature cap to the first leaf or the second leaf.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings.

Figure 1A:
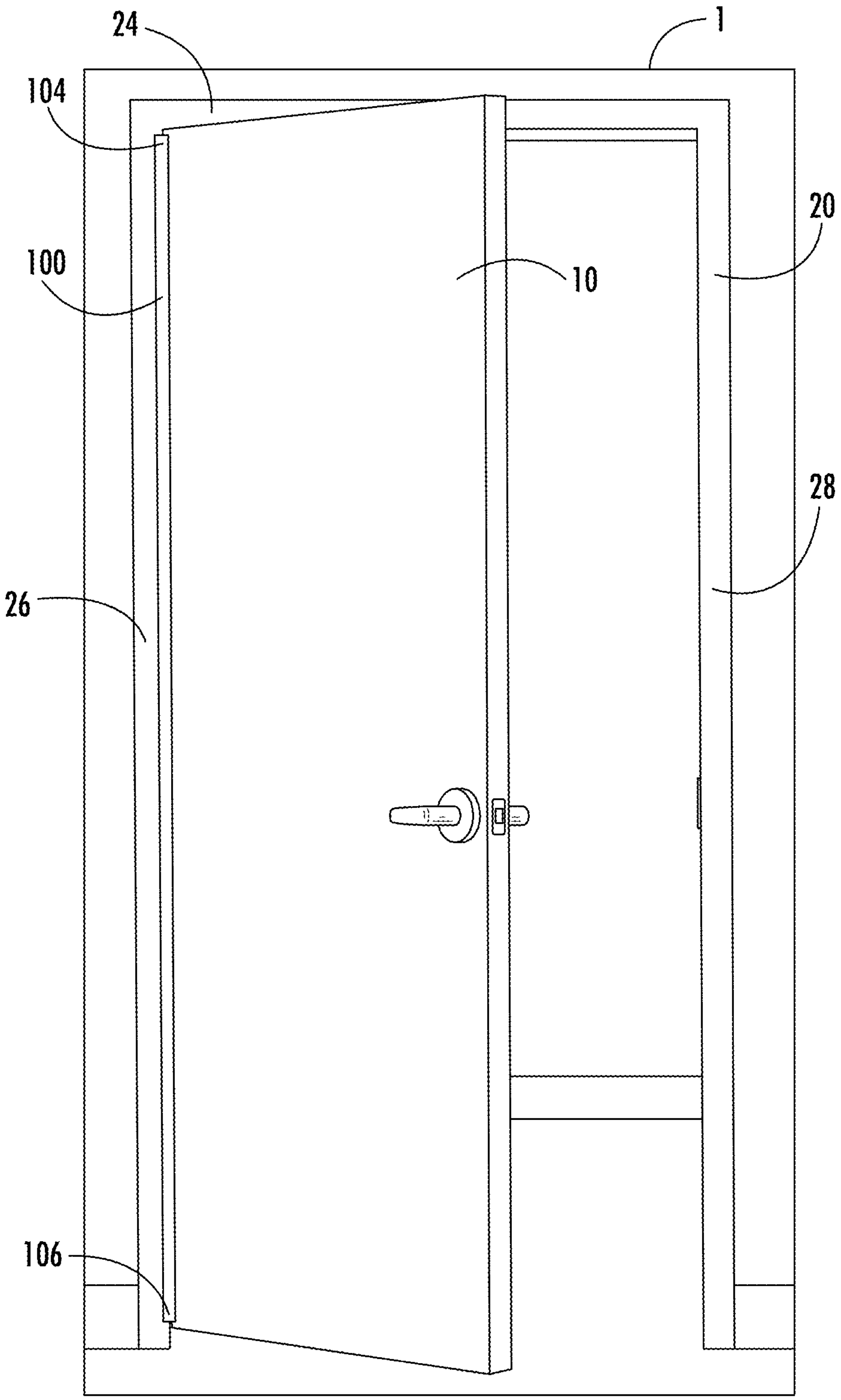

FIG. 1A is a front view of a door system with a continuous anti-ligature hinge, in accordance with embodiments of the present disclosure.

FIG. 1B is a first side view of a continuous anti-ligature hinge with an anti-ligature cap on the upper end and an anti-ligature cap on the lower end, in accordance with embodiments of the present disclosure.

FIG. 1C is a second side view of a continuous anti-ligature hinge with an anti-ligature cap on the upper end and an anti-ligature cap on the lower end, in accordance with embodiments of the present disclosure.

Figure 2:
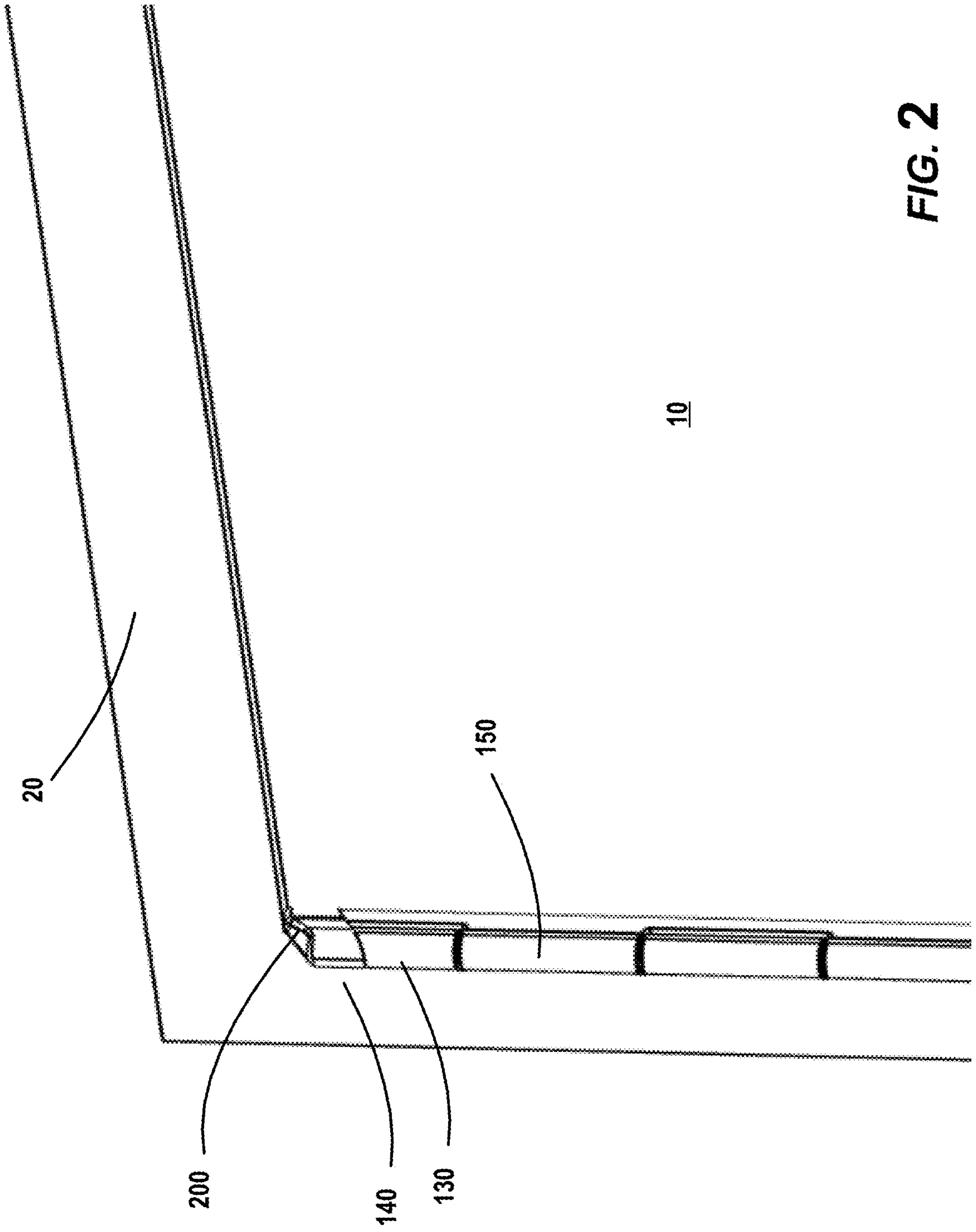

FIG. 2 is an enlarged perspective view of a door system with a continuous anti-ligature hinge, in accordance with embodiments of the present disclosure.

Figure 3:
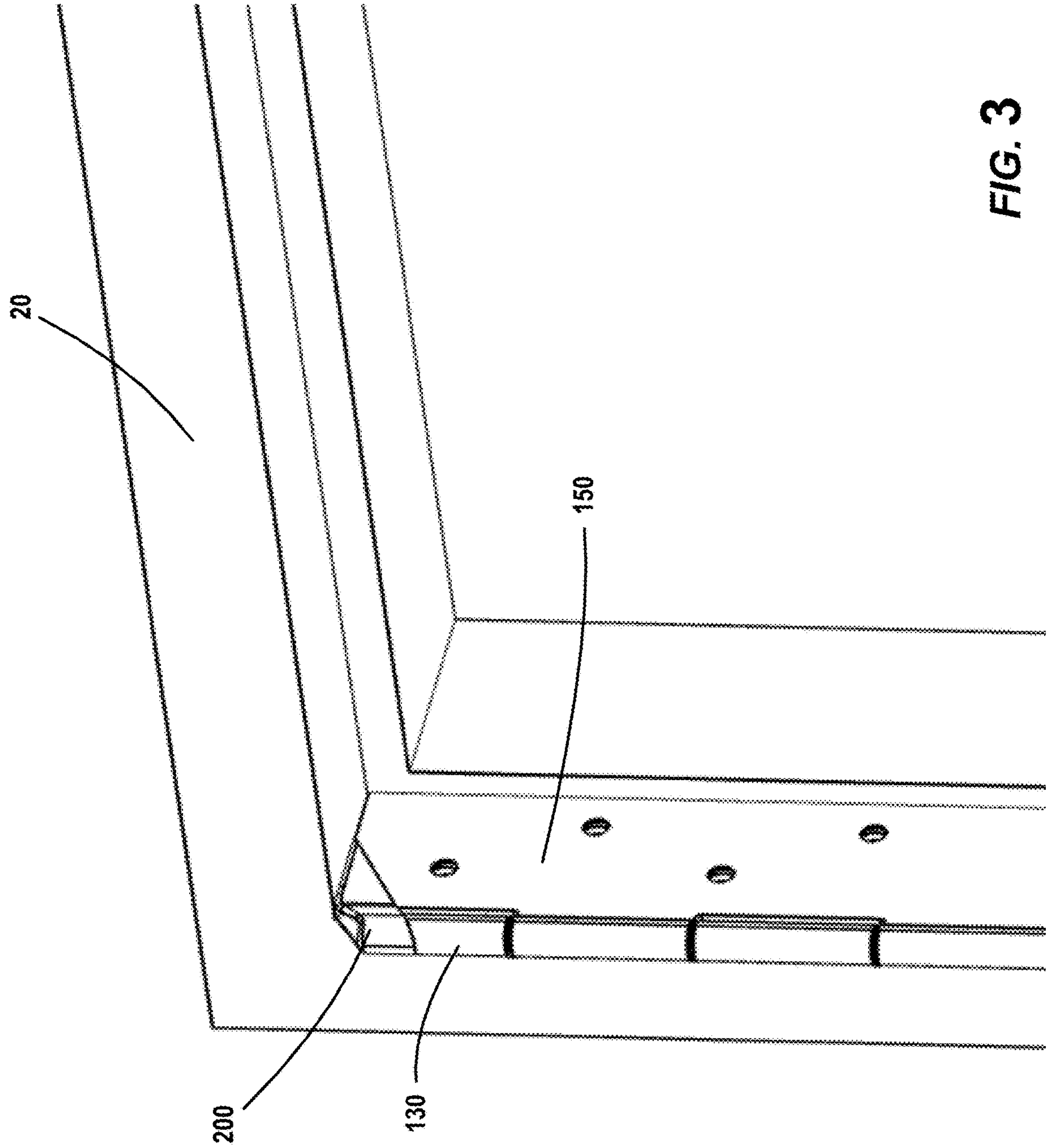

FIG. 3 is an enlarged perspective view of the door system with the continuous anti-ligature hinge of FIG. 2 with the door removed, in accordance with embodiments of the present disclosure.

Figure 4:
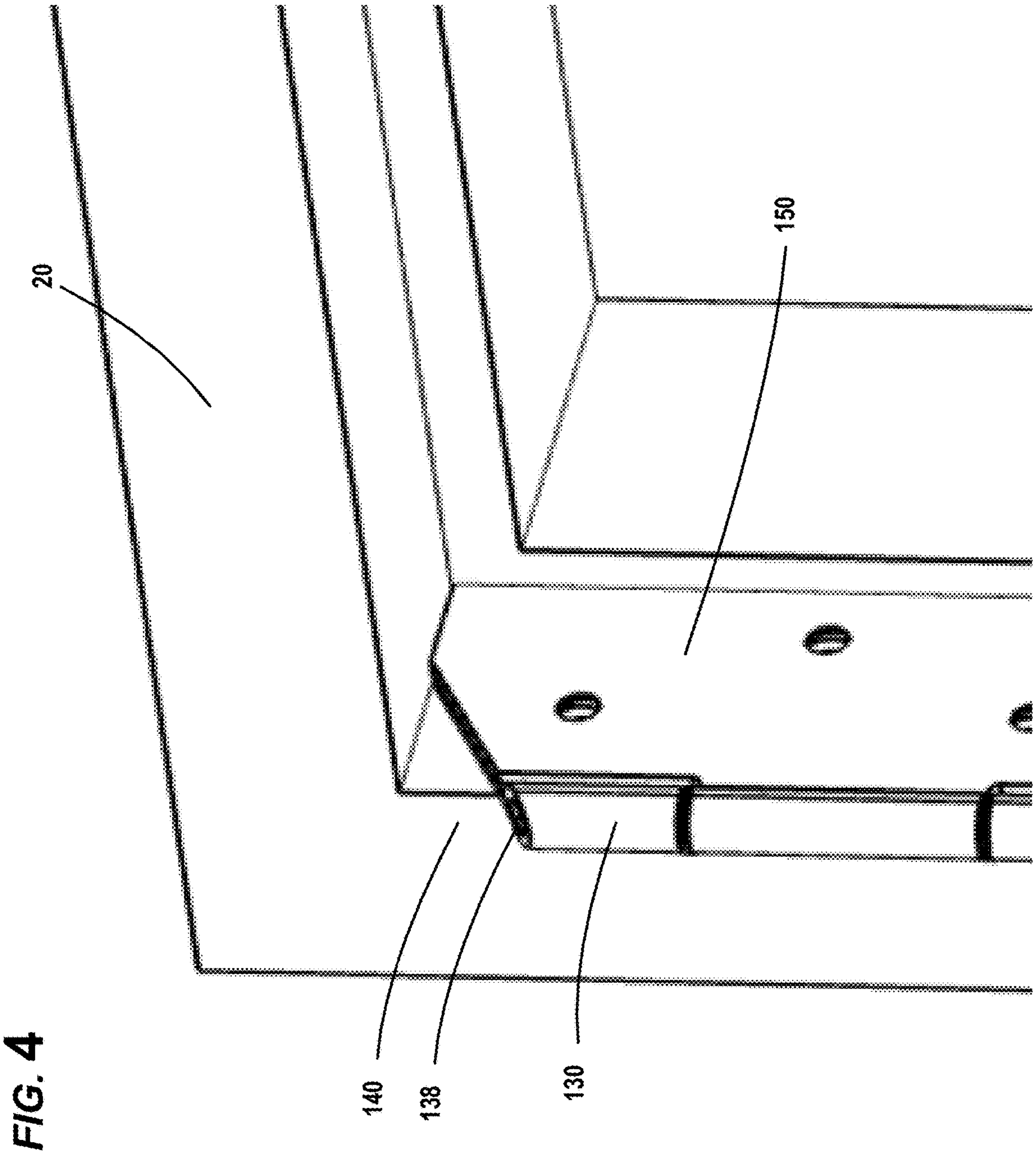

FIG. 4 is an enlarged perspective view of the door system with the continuous anti-ligature hinge of FIG. 2 with the door and anti-ligature cap removed, in accordance with embodiments of the present disclosure.

Figure 5:
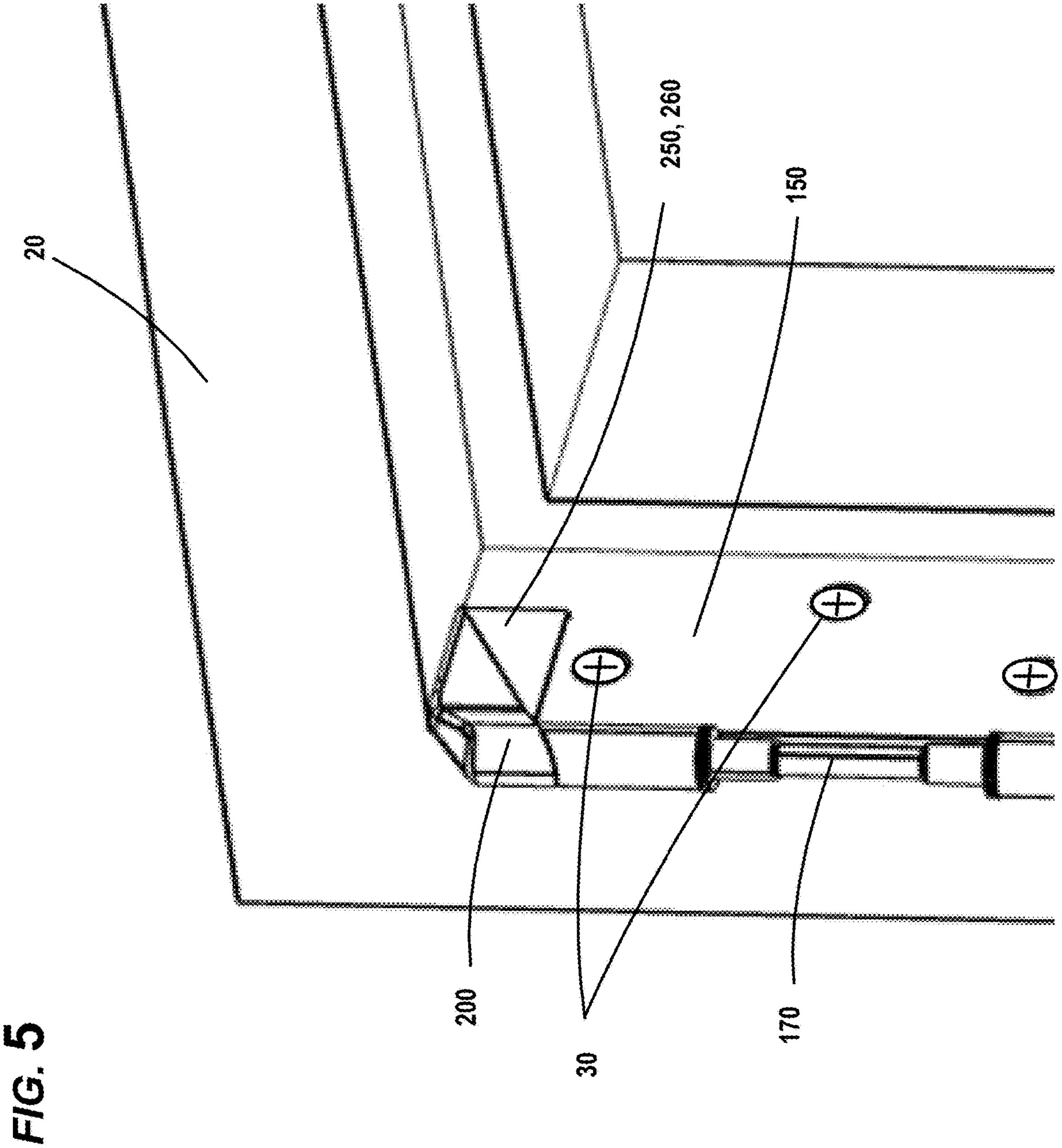

FIG. 5 is an enlarged perspective view of the door system with the continuous anti-ligature hinge of FIG. 2 with the door and second hinge leaf removed, in accordance with embodiments of the present disclosure.

Figure 6:
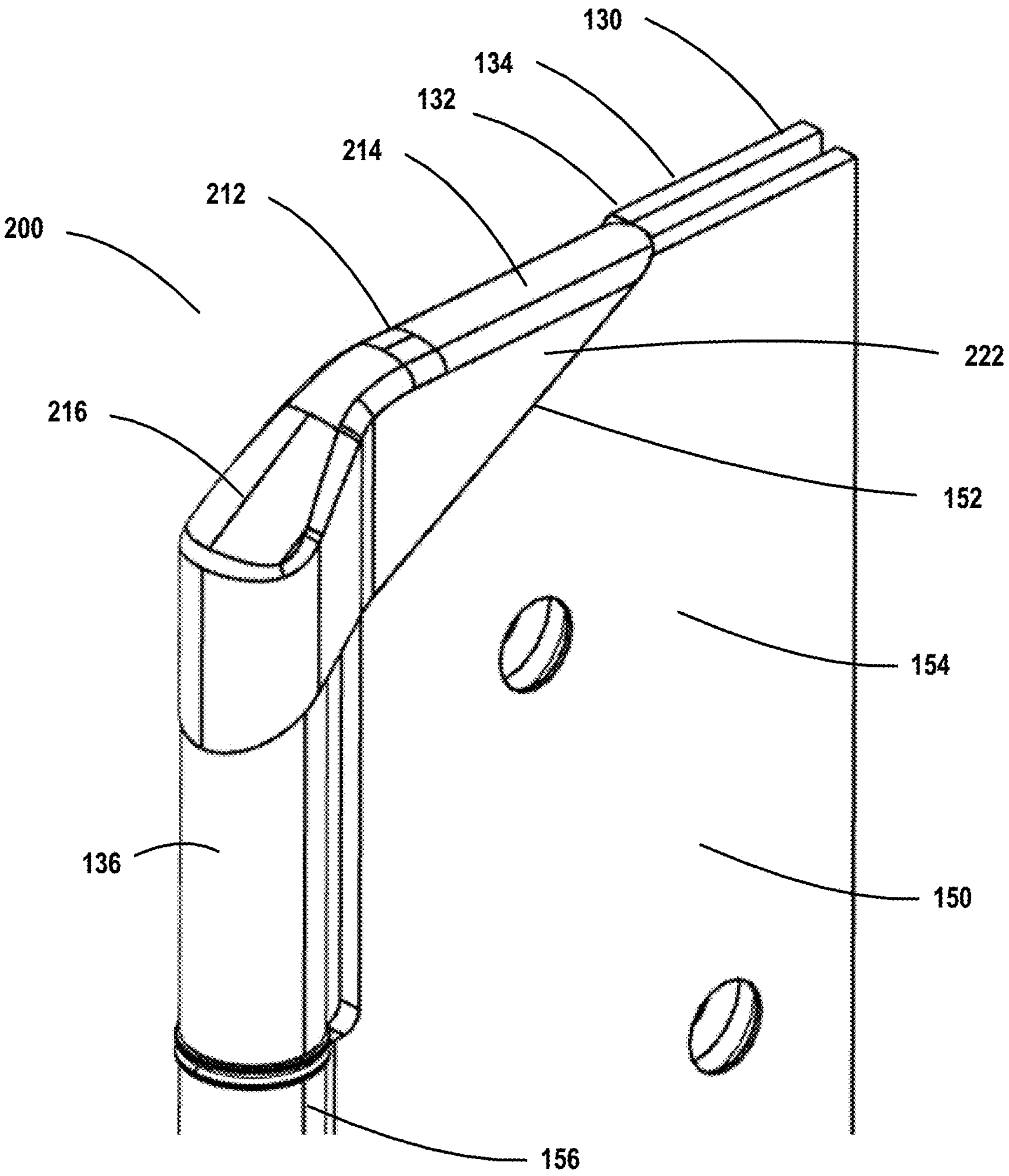

FIG. 6 is an enlarged perspective view of a continuous anti-ligature hinge, in accordance with embodiments of the present disclosure.

Figure 7:
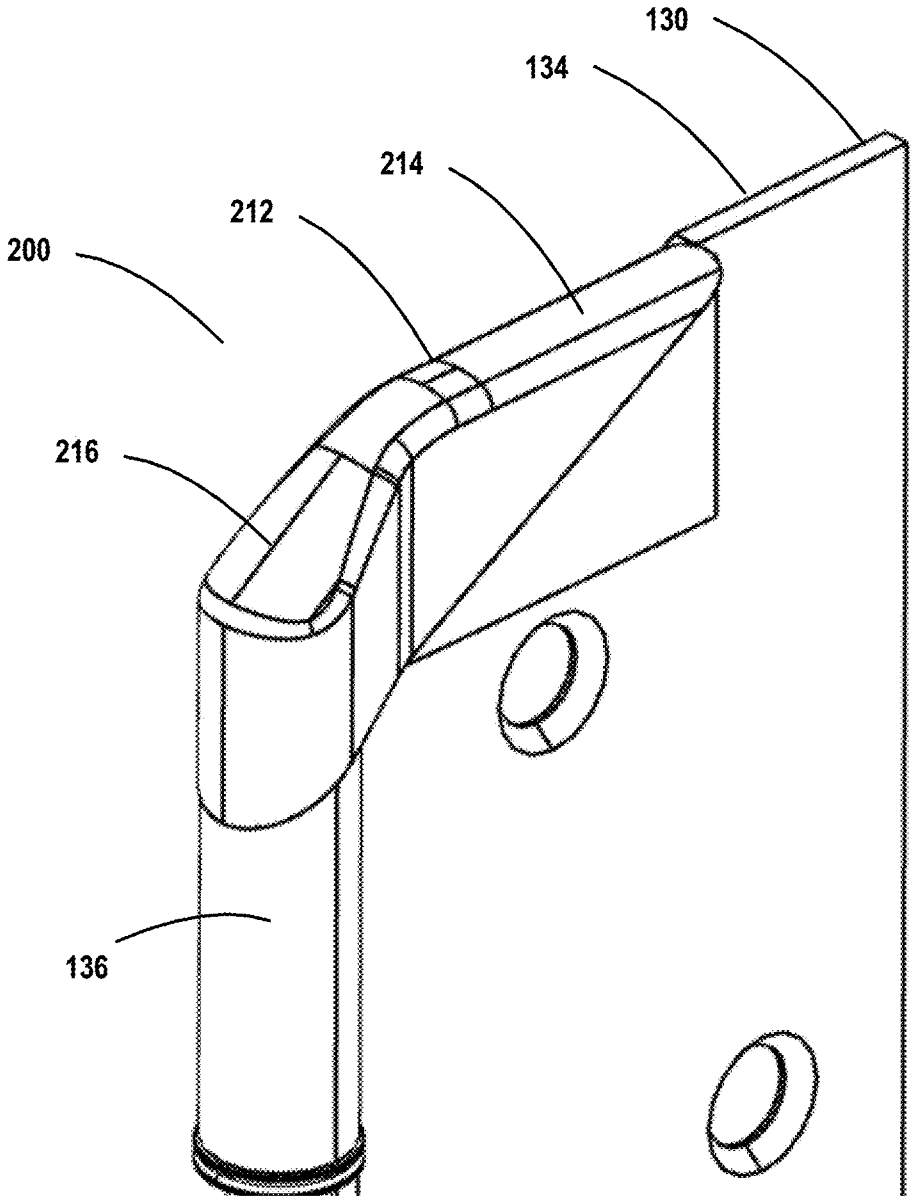

FIG. 7 is an enlarged perspective view of the continuous anti-ligature hinge of FIG. 6 with the second hinge leaf removed, in accordance with embodiments of the present disclosure.

FIG. 8A is an enlarged perspective view of the continuous anti-ligature hinge of FIG. 6 with the anti-ligature cap removed, in accordance with embodiments of the present disclosure.

FIG. 8B is an enlarged perspective view of the continuous anti-ligature hinge of FIG. 6 with the second hinge leaf and anti-ligature cap removed, in accordance with embodiments of the present disclosure.

FIG. 9 is a perspective view of an anti-ligature cap for an anti-ligature hinge, in accordance with embodiments of the present disclosure.

Figure 10A:
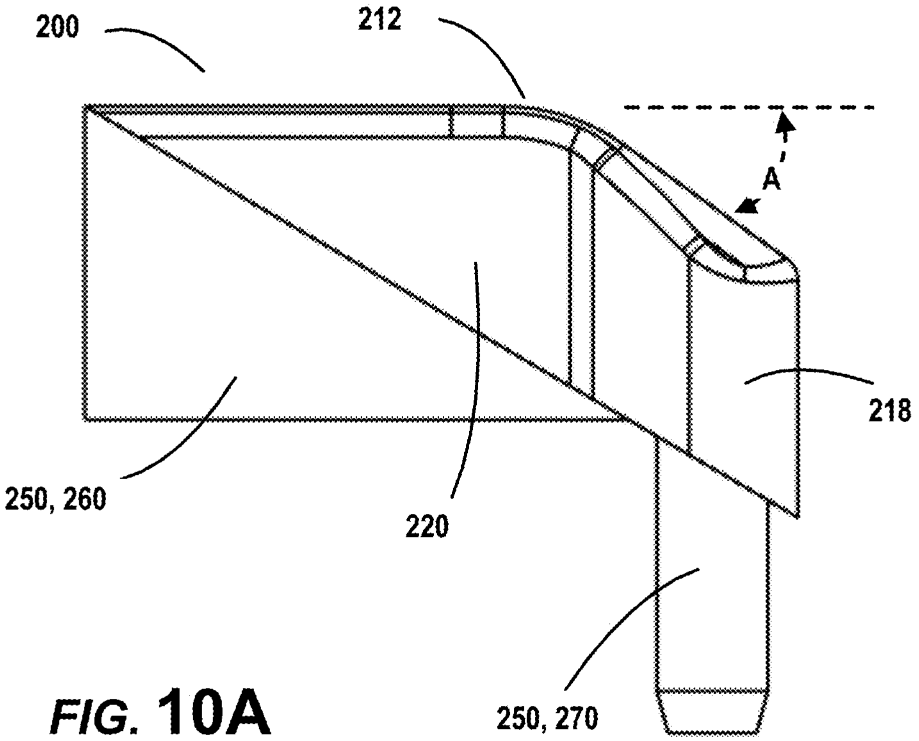

FIG. 10A is a first side view of an anti-ligature cap for an anti-ligature hinge, in accordance with embodiments of the present disclosure.

Figure 10B:
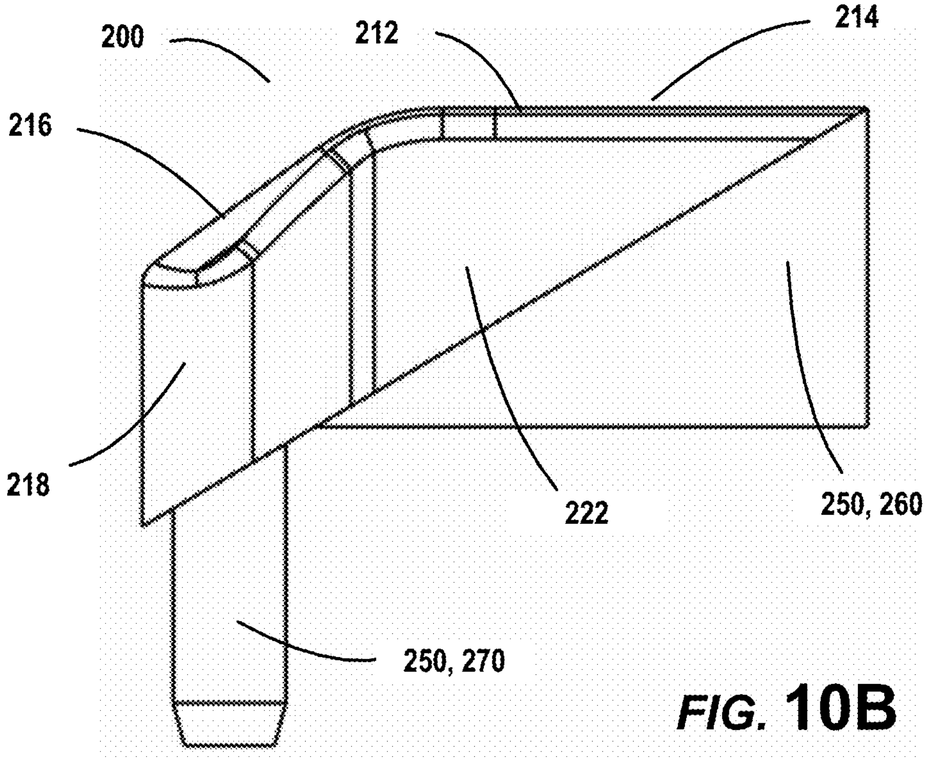

FIG. 10B is a second side view of an anti-ligature cap for an anti-ligature hinge, in accordance with embodiments of the present disclosure.

Figures 11A, 11B:
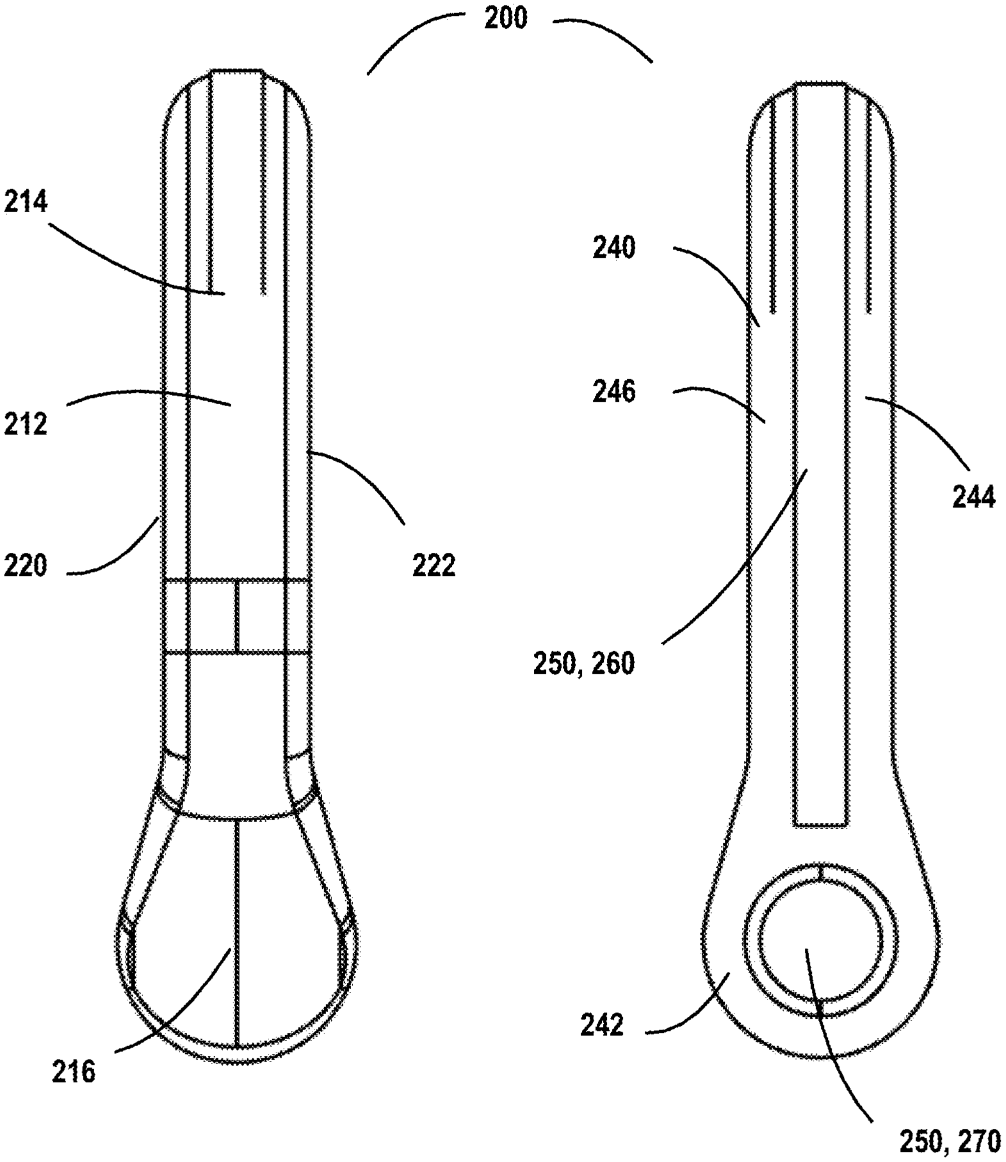

FIG. 11A is a top view of an anti-ligature cap for an anti-ligature hinge, in accordance with embodiments of the present disclosure.

FIG. 11B is a bottom view of an anti-ligature cap for an anti-ligature hinge, in accordance with embodiments of the present disclosure.

Figure 12A:
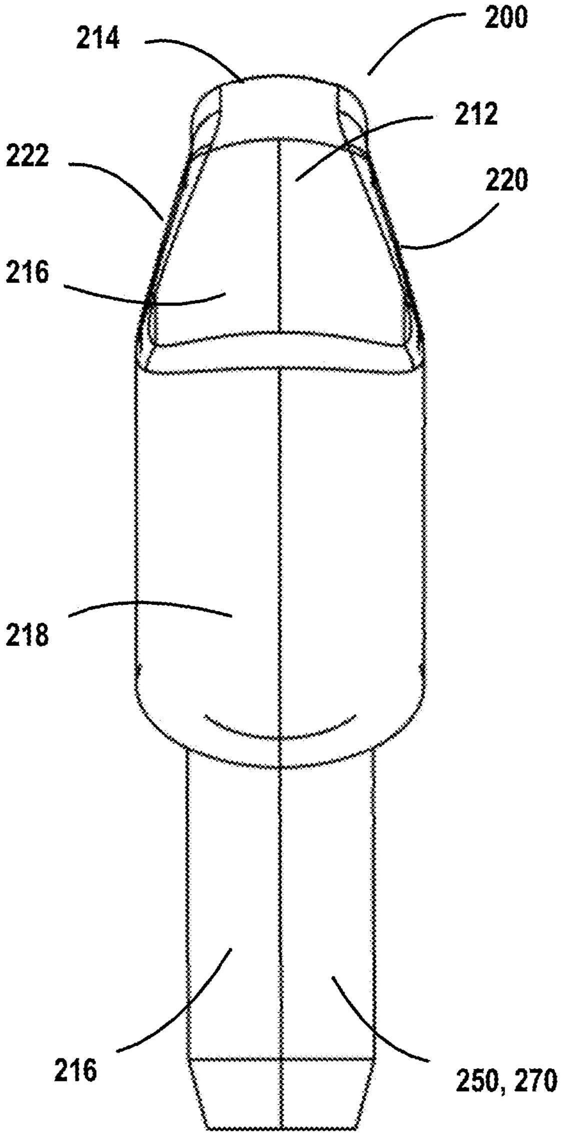

FIG. 12A is a front view of an anti-ligature cap for an anti-ligature hinge, in accordance with embodiments of the present disclosure.

Figure 12B:
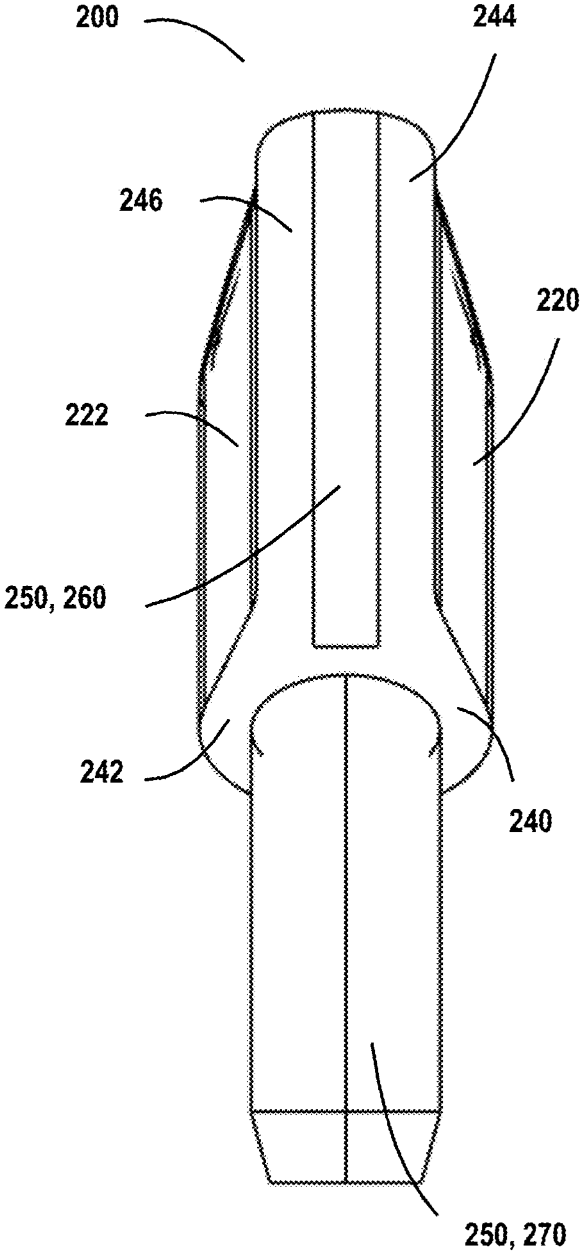

FIG. 12B is a rear view of an anti-ligature cap for an anti-ligature hinge, in accordance with embodiments of the present disclosure.

FIG. 13 is a perspective view of an anti-ligature cap for an anti-ligature hinge, in accordance with embodiments of the present disclosure.

Figure 14A:
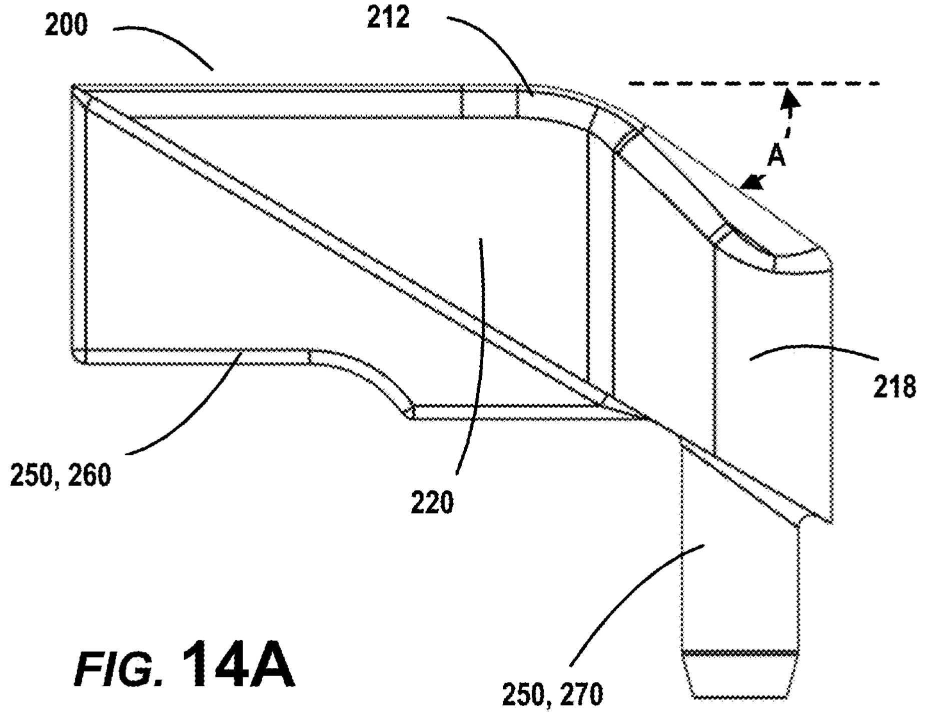

FIG. 14A is a first side view of an anti-ligature cap for an anti-ligature hinge, in accordance with embodiments of the present disclosure.

Figure 14B:
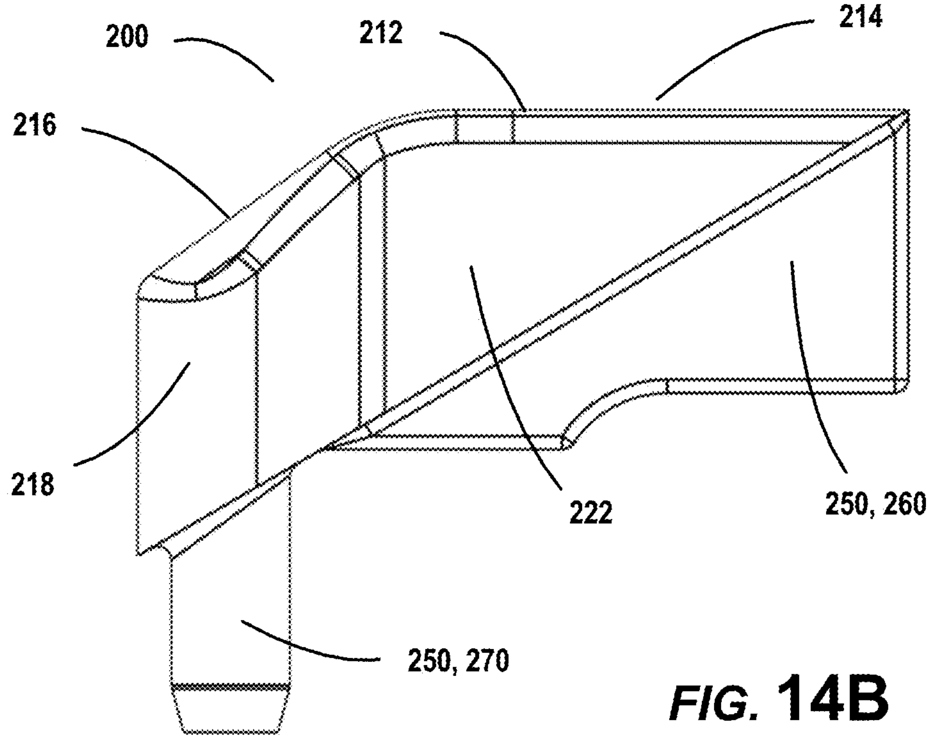

FIG. 14B is a second side view of an anti-ligature cap for an anti-ligature hinge, in accordance with embodiments of the present disclosure.

Figure 15A:
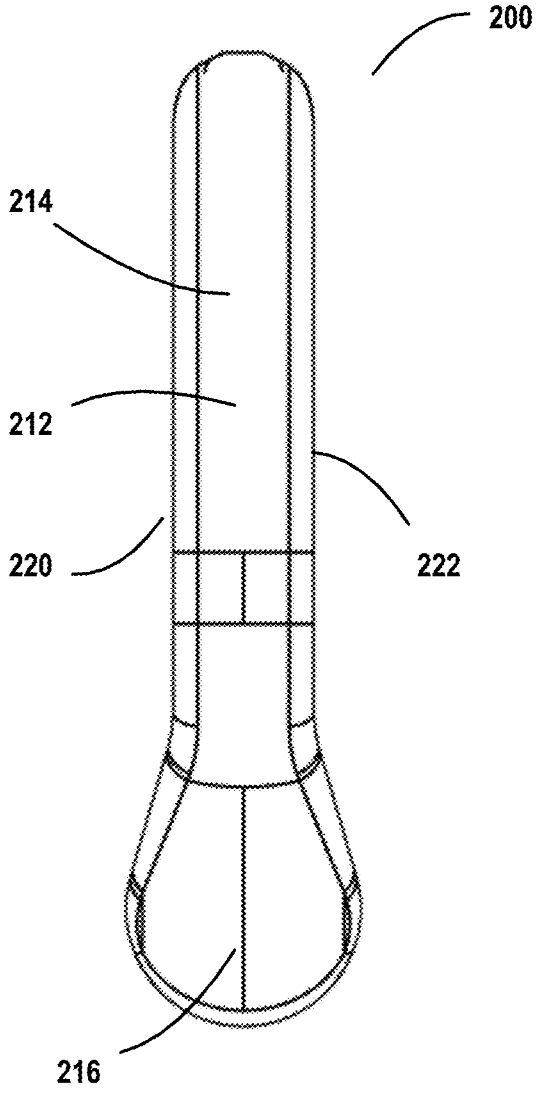

FIG. 15A is a top view of an anti-ligature cap for an anti-ligature hinge, in accordance with embodiments of the present disclosure.

Figure 15B:
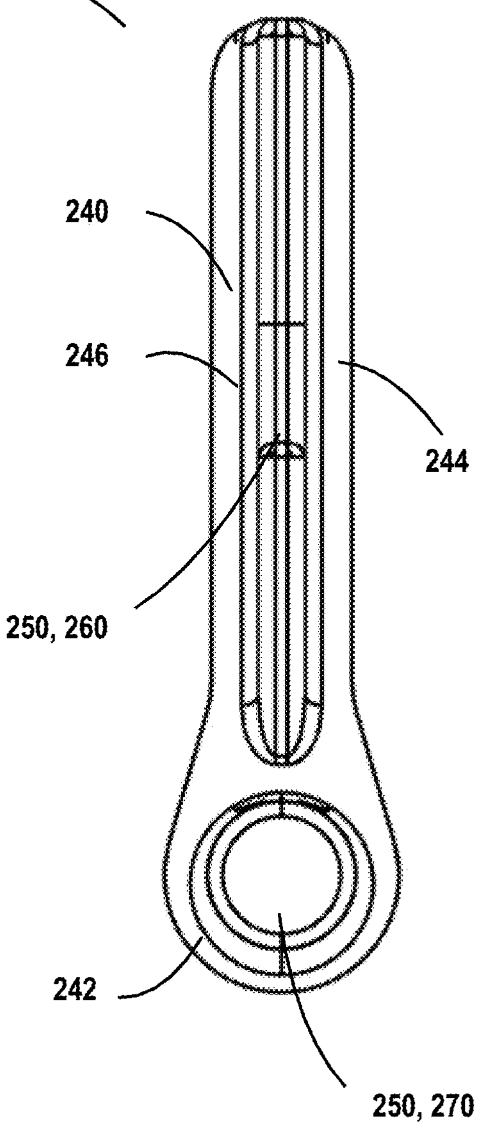

FIG. 15B is a bottom view of an anti-ligature cap for an anti-ligature hinge, in accordance with embodiments of the present disclosure.

FIG. 16A is a front view of an anti-ligature cap for an anti-ligature hinge, in accordance with embodiments of the present disclosure.

FIG. 16B is a rear view of an anti-ligature cap for an anti-ligature hinge, in accordance with embodiments of the present disclosure.

Figure 17:
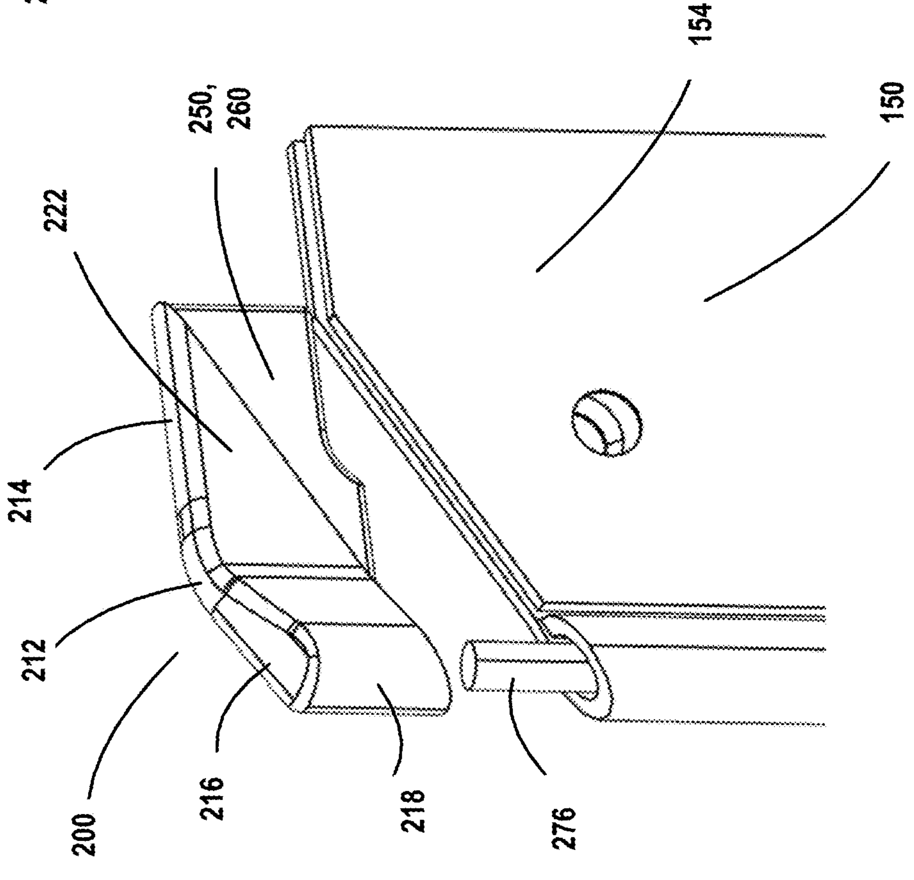

FIG. 17 illustrates a perspective top view of an anti-ligature cap for an anti-ligature hinge, in accordance with embodiments of the present disclosure.

Figure 18:
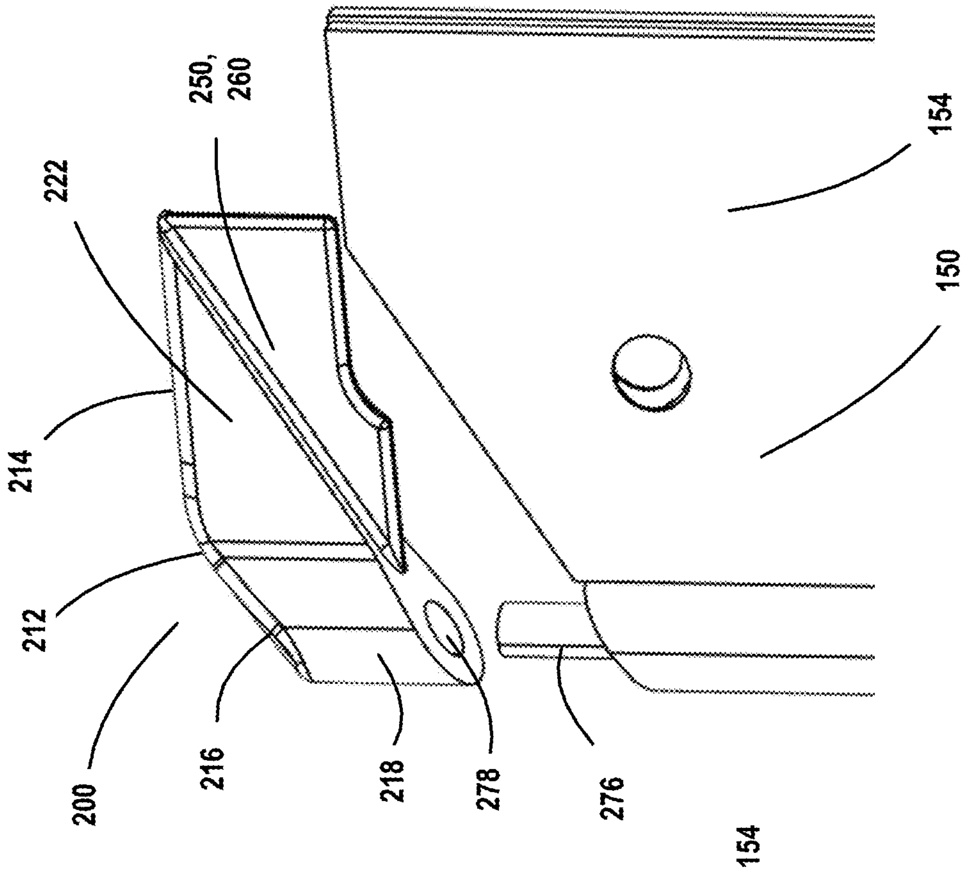

FIG. 18 illustrates a perspective bottom view of an anti-ligature cap for an anti-ligature hinge, in accordance with embodiments of the present disclosure.

Figures 19A, 19B, 19C:
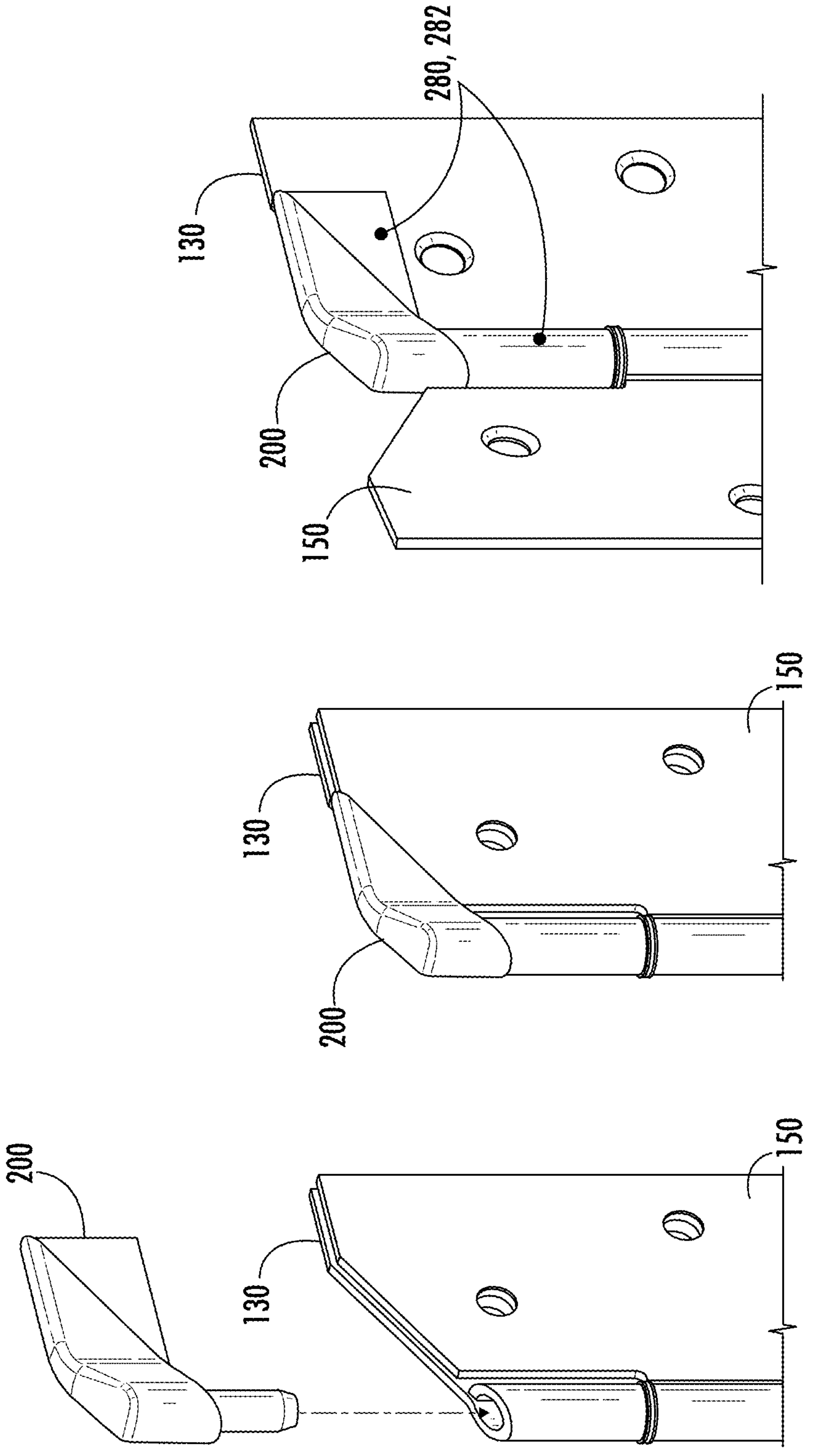

FIG. 19A is a perspective view of an anti-ligature cap being assembled to an assembled leaf portion, in accordance with embodiments of the present disclosure.

FIG. 19B is a perspective view of an anti-ligature hinge with the hinge leaves in a closed position, in accordance with embodiments of the present disclosure.

FIG. 19C is a perspective view of an anti-ligature hinge with the hinge leaves in an open position, in accordance with embodiments of the present disclosure.

FIG. 20A is a perspective view of an anti-ligature hinge having an anti-ligature cap with a cap leaf, in accordance with embodiments of the present disclosure.

FIG. 20B is a perspective view of the anti-ligature hinge having the anti-ligature cap with the cap leaf of FIG. 20A with the second leaf removed, in accordance with embodiments of the present disclosure.

Figure 20C:
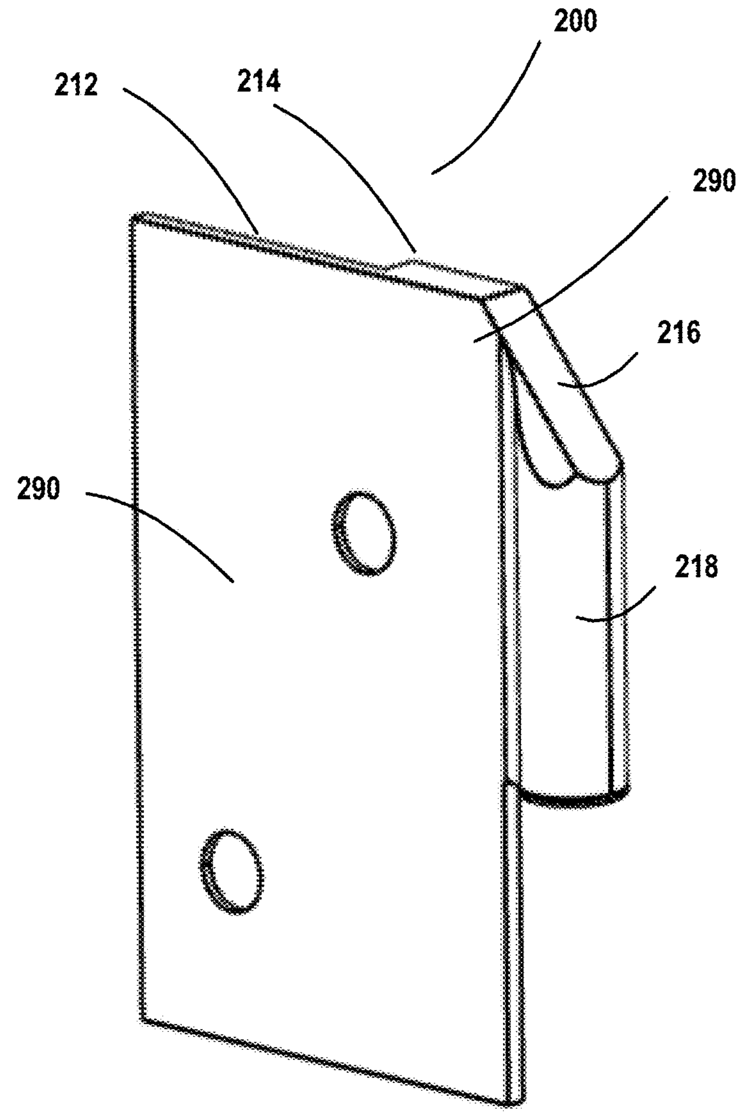

FIG. 20C is a perspective view of the anti-ligature cap with the cap leaf of FIG. 20A, in accordance with embodiments of the present disclosure.

Figure 21:
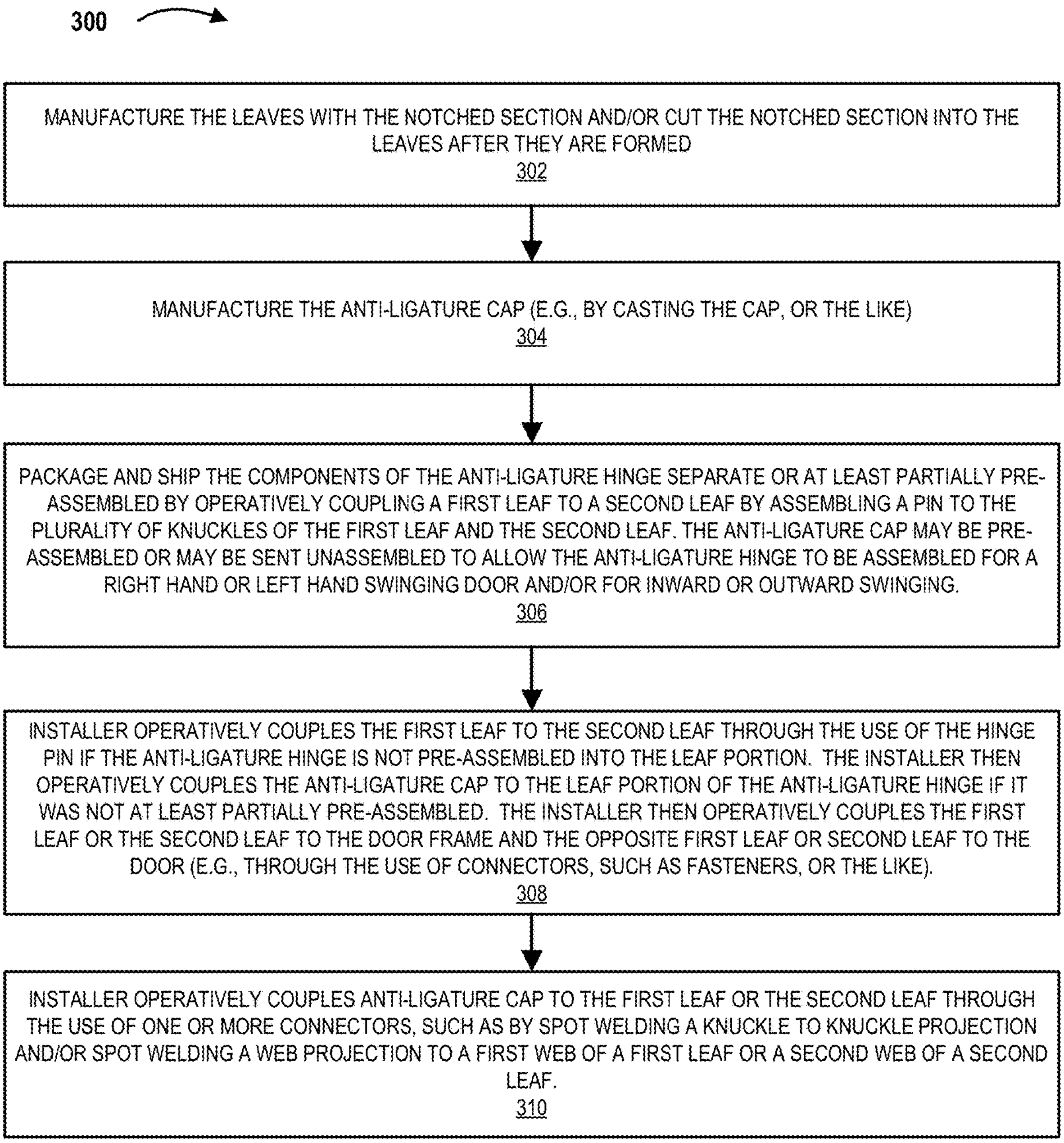

FIG. 21 is a method of manufacturing and installing the anti-ligature hinge, in accordance with embodiments of the present disclosure.

DETAILED DESCRIPTION

The following detailed description teaches specific example embodiments of the invention; however, other embodiments of the invention do not depart from the scope of the present invention. The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “includes” and/or “including” when used herein, specify the presence of stated features, steps, operations, elements, and/or components, but do not preclude the presence or addition of one or more other features, steps, operations, elements, components, and/or groups thereof.

Embodiments of the invention will be described with respect to FIGS. 1A through 20C illustrating an anti-ligature hinge 100, which in some embodiments is a continuous anti-ligature hinge 100 that provides improved features for anti-ligature hinges. The anti-ligature hinge 100 may be a continuous anti-ligature hinge (e.g., extending along a portion of, the majority of, or the entire length of the door edge of the door 10 and/or the door frame 20), and is operatively coupled to the door 10 and the door frame 20 for pivotal movement of the door 10 relative to the door frame 20 between a closed position and one or more open positions (e.g., including a fully open position). As illustrated in FIGS. 1B and 1C, and as will be described in further detail herein, the anti-ligature hinge 100 may comprise an assembled leaf portion 102 comprising a pair of leaves 130, 150 that are operatively coupled together using one or more hinge pins 170. As illustrated in FIGS. 1A through 1C, the leaf portion 102 may comprise an upper end 104 (e.g., proximal end, or the like) and a lower end 106 (e.g., a distal end, or the like). The anti-ligature hinge 100 may comprise at least one anti-ligature cap 200 that is operatively coupled to the upper end 104 of the assembled leaf portion 102 and/or the lower end 104 of the assembled leaf portion 102 (e.g., in some embodiments, to both ends 104, 106). The anti-ligature cap 200 may comprise a body 210 with one or more projections 250. The one or more projections 250 may comprise a leaf projection 260 that is configured to be located between the first leaf 130 and the second leaf 150 and operatively coupled to the first leaf 130 or the second leaf 150. The one or more projections 250 may further comprise a knuckle projection 270 that is configured to be operatively coupled to a knuckle of the first leaf 130 or the second leaf 150, such as by being inserted into a knuckle aperture formed by the inner surface of the knuckle. The one or more projections 250 may be operatively coupled to the first leaf 130 and/or the second leaf 150 through the use of a connector (e.g., weld, fastener, crimping, button punch, interference fit, or the like). It should be understood that the fastener may be any type of fastener, such as, a screw, bolt, rivet, pin, or other like fastener. The body of the anti-ligature cap 200 may be shaped such that it does not include any sharp edges and may be angled downwardly such that objects cannot be hung on the surfaces of the anti-ligature cap 200. Moreover, when installed the anti-ligature cap 200 may be flush with the leaf portion 102 of the hinge.

FIG. 1A illustrates a door system 1 that utilizes the anti-ligature hinge 100 illustrated and described with respect to FIGS. 1B through 20C. As illustrated in FIG. 1, the door system 1 may comprise a door 10 operatively coupled to a door frame 20, which is operatively coupled to a wall (e.g., an opening in a wall). The door frame 20 may comprise three (3) portions including an upper portion 24 disposed adjacent an upper end (e.g., header) of a door opening, and two side portions 26, 28 disposed along either edge of the door opening, with one side portion 26 being on the hinge side of the door 10, and the opposite side portion 28 being on the latch side of the door 10. The door frame portions 24, 26, 28 may be secured to each other and/or an adjoining structure by frame connectors (e.g., clips, tabs, fasteners, or the like). The door 10 may be hung otherwise conventionally within the door opening by the anti-ligature hinge 100, such as through hinge connectors 30. The connectors 30 may comprise fasteners that secure the anti-ligature hinge 100 through leaf apertures in one leaf to a door frame 20 (e.g., to one or more hinge reinforcements in the door frame 20) and/or in another leaf to an edge of the door 10 (e.g., to a side edge that may or may not have hinge reinforcements in the door 10). Other types of hinge connectors 30, such as welds, non-removeable fasteners, or the like may be used to operatively couple the anti-ligature hinge 100 to the door 10 and/or door frame 20. It should be understood that the door 10 and door frame 20 may be any type of conventional door and door frame of any size and shape, and made of any type of material (e.g., wood, metal hollow, metal with a core, plastic, composite, or the like, or combinations thereof).

As illustrated in FIGS. 3 through 5, the anti-ligature hinge 100 may comprise a leaf portion 102 comprising a pair of leaves 130, 150 that are operatively coupled together using one or more pins 170. The leaf portion 102 may comprise an upper end 104 (e.g., proximal end, or the like) and a lower end 106 (e.g., a distal end, or the like). Moreover, the anti-ligature hinge 100 may comprise at least one anti-ligature cap 200 that is operatively coupled to one or more of the ends 104, 106 the leaf portion 102. As illustrated in FIG. 2, the anti-ligature cap 200 is operatively coupled to the upper end 104 of the leaf portion 102. It should be understood that the assembly of the anti-ligature cap 200 is described herein with respect to the upper end 102 of the leaf portion 102 of the anti-ligature hinge 100; however, it should be understood that the anti-ligature cap 200 may be assembled to the lower end 102 of the leaf portion of the anti-ligature hinge 100 in the same or similar way.

As illustrated throughout the figures, the leaf portion 102 may comprise a first leaf 130 and a second leaf 150. Each of the two leaves 102 may have webs that are operatively coupled to knuckles. For example, the first leaf 130 may comprise a first web 134 operatively coupled to a plurality of first knuckles 136, while the second leaf 150 may comprise a second web 154 operatively coupled to a plurality of second knuckles 156. The plurality of knuckles 134, 154 may be spaced apart such that the plurality of first knuckles 136 may interlock with the plurality of second knuckles 156 (e.g., in an alternating pattern, non-uniform pattern, or the like). The plurality of knuckles may have first apertures 138 and second apertures 158 that are formed by the inner surfaces of the plurality of knuckles 136, 156, and are aligned when the plurality of knuckles 136, 156 are interlocking. The plurality of first knuckles 136 are operatively coupled to the plurality of second knuckles 156 through the use of one or more hinge pins 170 that extend through at least a portion of the first apertures 138 and the second apertures 158.

Like the leaf portion 102, the first leaf 130 may have a first upper end 140 and a first lower end 142, while the second leaf 150 may have a second upper end 160 and a second lower end 162. As illustrated in FIGS. 7-8B, the first upper end 140 and/or the second upper end 160 may have at least a portion that is a notched section 180. The notched section 180 may be any type of shape, but in some embodiments the notched section may be rectangular, square, triangular, stepped, curved (e.g., semi-circular, semi-oval), parabolic, hyperbolic, or the like, and moreover, may be uniform or non-uniform in shape. In some embodiments the notched section 180 may be a bevel 182 of uniform or non-uniform shape. As illustrated in the figures, the bevel 182 may be defined as a top bevel that is uniform (e.g., planer). In some embodiments, the notched section 180 only occurs in the webs 134, 154, but in other embodiments, as illustrated in FIGS. 8A and 8B, the notched section 180 may be located in the webs 134, 154 and a knuckle (e.g., a first knuckle 136 or a second knuckle 156 depending on the hinge configuration) of the anti-ligature hinge 100.

As illustrated in FIGS. 9 through 16B, the anti-ligature cap 200 may comprise a body 210 with one or more projections 250. The body of the anti-ligature cap 200 may comprise a top surface 212 having a frame section 214 and an exposed section 216. It should be understood that the frame section 214 may be generally planer and may be hidden when assembled to the leaf portion 102 of the anti-ligature hinge 100 when the anti-ligature hinge 100 is assembled to the door 10 and door frame 20. The exposed section 216 of the top surface 212 of the anti-ligature cap 200 may diverge away from and extend downwardly towards the floor when the anti-ligature cap 200 is installed on the upper end 104 of the leaf portion 102 of the anti-ligature hinge 100. However, the exposed section 216 may diverge away from and extend upwardly towards the ceiling when the anti-ligature cap 200 is installed on the lower end 106 of the leaf portion 102 of the anti-ligature hinge 100. In some embodiments, the diverging exposed section 216 may have an angle of 10, 20, 30, 40, 45, 50, 60, 70, 80, or a range of angles of any of the foregoing that fall within, outside, or overlap the angles above, with respect to a horizontal plane as noted by reference A in FIG. 10A. In some embodiments, the angle A may range between 10 and 80 degrees, and in particular embodiments between 30 and 60 degrees or between 40 and 50 degrees. It should be understood that an angle of a beveled notched section 180 of the leaf portion 102 may be the same as or different than the angle A described above.

As illustrated in FIGS. 9 through 16B, the exposed section 216 of the anti-ligature cap 200 may further comprise a generally cylindrical shape 218 that is flush with at least a portion of the outer surface of the knuckle 136 to which the anti-ligature cap 200 is operatively coupled during installation. Moreover, the anti-ligature cap 200 may further comprise a first side cap surface 220 and a second side cap surface 222. When installed, as illustrated in FIG. 6, the first side cap surface 220 may be flush with an outer surface 132 of the first leaf 130, and the second side cap surface 222 may be flush with an outer surface 152 of the second leaf 150. In this way, the frame section 214 of the anti-ligature hinge 100 may be located between the edge surface of the door 10 and the jamb surface of the door frame 20 when the anti-ligature hinge 100 is installed and the door 10 of the door system 1 is closed, as illustrated in FIG. 2.

As illustrated in FIGS. 11B-12B and 15B-16B, the anti-ligature cap 200 may further comprise a bottom surface 240 from which the one or more projections 250 extend. As such, the bottom surface may comprise a knuckle shoulder 242, a first leaf shoulder 244, and a second leaf shoulder 246. It should be understood that the knuckle shoulder 242 may engage with a knuckle 134, 154 of the first leaf 130 or the second leaf 150. Furthermore, it should be understood that the first leaf shoulder 244 may engage with the notched section 180 of the end of the first leaf 130 and the second leaf shoulder 246 may engage with the notched section 180 of the end of the second leaf 150. Depending on the shape of the notched section 180 of the anti-ligature hinge 100, the anti-ligature cap 200 may have multiple shoulders that are configured to engage with different surfaces of the notched section 180 (e.g., square, curved, stepped, or the like surface of the notched section 180 of the end of the leaf portion 102 of the anti-ligature hinge 100. While the anti-ligature cap 200 is illustrated as tapering, and only extending over a portion of the upper end 104 of the leaf portion 102, in some embodiments the length of the assembled leaf portion 102 (or a first leaf 130 or a second leaf 150 thereof) may be shortened, have a notched section 180, or the like such that at least a portion of the anti-ligature cap 200 extends over the entire upper end 104 of the leaf portion 102.

As discussed herein, the one or more projections 250 of the anti-ligature cap 200 may comprise a leaf projection 260 and a knuckle projection 270. The leaf projection 260 may extend from the bottom surface 240 of the anti-ligature cap 200. The leaf projection 260 may be configured to be located between the inner surface of the first web 134 of the first leaf 130 and the inner surface of the second web 154 of the second leaf 150. In some embodiments, the leaf projection 260 may have a thickness that is less than or equal to the size of the space between the first web 134 and the second web 154 when the door 10 of the door system 1 is in a closed position. In some embodiments, the leaf projection 260 may have an angled thickness that is converging or diverging (e.g., a draft angle, a tapered thickness, or the like), a non-uniform thickness, a stepped configuration with different thickness, or other like configuration. The leaf projection 260 is illustrated as having a triangular shape; however, it should be understood that the leaf projection 260 may have any type of shape (e.g., semi-circular, square, rectangular, or the like) that allows the leaf projection 260 to be located between the first leaf 130 and the second leaf 150. Furthermore, while FIGS. 9-12B illustrate that the leaf projection 260 has a uniform shape (e.g., triangular), it should be understood that the leaf projection 260 may have a notched portion 262 that provides a non-uniform shape. For example, as illustrated in FIGS. 13-16B, the leaf projection 260 may have notched section 262 that allows for the use of the anti-ligature cap 200 with multiple anti-ligature hinges 100 that have different aperture patterns for operative coupling with a door 10 and/or a door frame 20. That is, the notch 262 may allow a connector 30 to pass through the web of the first leaf 130 and/or the second leaf 150 without interfering with the leaf projection 260. Moreover, as will be discussed in further detail herein, the leaf projection 260 may be operatively coupled to the inner surface of the first web 134 or the inner surface of the second web 154 through the use of one or more connectors (e.g., fasteners, welds, crimping, button punches, interference fits, or the like) depending on the installation of the anti-ligature hinge 100.

The knuckle projection 270 (or pin projection 270) may be configured to be operatively coupled to a knuckle 136, 156 of the first leaf 130 or the second leaf 150, as will be discussed in further detail below. The knuckle projection 270 is illustrated as being a pin having a generally cylindrical shape with a converging end, which is configured to be located within an aperture 138, 158 created by the inner surface of a knuckle 134, 154 of the first leaf 130 or the second leaf 150. However, it should be understood that the knuckle projection 270 may have different types of shapes (e.g., square, half-circular, triangular, or the like).

While the embodiments illustrated in the figures indicate that the one or more projections 250 are extending from the anti-ligature cap 200, it should be understood that alternatively, or additionally, the anti-ligature cap 200 may have recesses. The recesses in the anti-ligature cap 200 may receive members that are operatively coupled to the first leaf 130 and/or second leaf 150 (e.g., independent members with projections that are welded thereto) and/or projections that extend from the first leaf 130 and/or the second leaf 150 (e.g., projecting from the knuckles 136, 156 and/or the webs 134, 154). As such, the anti-ligature cap 200 may be operatively coupled to the leaf portion 102 at least partially by receiving one or more projections in one or more recesses. For example, in some embodiments, as illustrated in FIGS. 17 and 18, the knuckle projection 270, 276 extends from a knuckle 136, 156 of the first leaf 130 and/or the second leaf 150 (e.g., is permanently or removable operatively coupled to one or more of the knuckles 136, 156), and is operatively coupled to the anti-ligature cap 200 through a recess 278 located in the anti-ligature cap 200.

FIGS. 19A through 19C illustrates how an anti-ligature cap 200 is assembled to the leaf portion 102 of the anti-ligature cap 200. As illustrated in FIG. 19A the leaf projection 260 of the anti-ligature cap 200 may be slid between the first web 134 and the second 154 and/or the knuckle projection 270 may be slid into a knuckle aperture 138, 158 formed by a knuckle 136, 156. As such, as illustrated in FIG. 19B, the anti-ligature cap 200 may be press-fit or may be removably operatively coupled to the leaf portion 102 (e.g., loosely assembled). As illustrated in FIG. 19C, the anti-ligature cap 200 may be operatively coupled to an inner surface of a leaf web (e.g., a first leaf web 134 as illustrated, or a second leaf web 154 in a different configuration). Additionally, or alternatively, a knuckle (e.g., a first knuckle 136 as illustrated, or a second knuckle 156 in a different configuration) may be operatively coupled to the knuckle projection 270. The connectors 280 may be spot welds 282 (e.g., as illustrated in FIG. 19C) or may be other types of connectors 280, such as other types of welds (e.g., butt weld, edge weld, or the like), fasteners (e.g., through the leaf projection 260, first web 134, and into a door frame 20 or door 20, or the like).

FIGS. 20A through 20C illustrate that in other embodiments of the invention, the anti-ligature cap 200 may include a cap leaf 290 that may act as at least a portion of the first leaf 130 or the second leaf 150. As such, in the embodiments illustrated in FIGS. 20A through 20C, only the second leaf 150 has the notched section 180 and the first leaf 130 is shorter than the second leaf 150.

Regardless of the configurations illustrated in FIGS. 1A through 20C, the anti-ligature hinges 100 may further comprise inserts, bearings, or other components between the individual knuckles 136, 156, between a knuckle 136, 156 and the anti-ligature cap 200, or the like in order to allow the hinge to rotate more freely, to restrict play in the assembled components, or the like.

It should be understood that the anti-ligature hinge 100, and in particular the anti-ligature cap 200 thereof, provide improved anti-ligature features, which reduce the chances that users could harm themselves. For example, the anti-ligature cap 200 has angled and/or rounded surfaces that reduce the ability for a user be to cut or hang something (e.g., shoelaces, sheets, rope, or the like) from the anti-ligature cap 200. Moreover, the configuration of the anti-ligature cap 200 improves the ease of manufacturing and assembly by eliminating the need to machine rounded and angled features into hinge. Moreover, the anti-ligature cap 200 allows for the anti-ligature hinge 100 be installed in right or left handed door that swings in or out.

The anti-ligature hinge 100 resists the ability of a flexible device to be looped around or tied off on the anti-ligature hinge 100 and/or to be jammed or wedged into any openings (e.g., since the cap 200 is flush with the hinge portion). Moreover, the anti-ligature hinge 100, in particular the anti-ligature cap 200, has round surfaces that resists cutting. Moreover, due to the assembly of the anti-ligature cap 200 with the leaf portion 102 of the anti-ligature hinge 100 (e.g., cap 200 located adjacent the door frame 20, operatively coupled with one or more connectors, and/or the like), the anti-ligature cap 200 cannot be removed once installed (e.g., without dissembling the anti-ligature hinge 100 from the door frame 20 and/or removing or damaging the connectors, or the like).

The anti-ligature hinge 100, in particular, the anti-ligature cap 200 (e.g., the top surface thereof) will at a minimum not hold a force greater than 11 lbs., and in some cases not hold a force of 10, 9, 8, 7, 6, 5, 4, 3, 2, 1, or the like lbs. or a range of any of the forgoing values. In particular embodiments, the anti-ligature cap 200 (e.g., the top surface thereof) will not support a force that is greater than 5.5 lbs. That is, for example should a lace or other flexible object be looped around the anti-ligature hinge it will release the flexible object when a force of greater than 5.5 lbs. is applied (or in other embodiments when a force between 1 and 11 lbs. described above is applied) in any direction (e.g., up, left, right, and in particular down, and/or at different angles).

FIG. 21 illustrates a method of manufacturing, shipping, and/or installing the anti-ligature hinges 100 described herein. As illustrated in block 302 of FIG. 21, the hinge leaves 130, 150 may be manufactured to create the desired lengths, web sizes of the webs 134, 154, sizes and number of knuckles 136, 156, or the like. It should be understood that leaves 130, 150 of a continuous hinge may be formed, and thereafter, cut into the desired lengths. Moreover, the notch section 180 of the leaves 130, 150 may be formed during manufacturing or may be cut into the leaves 130, 150 of the first leaf 130 and the second leaf 150. The materials used for the hinge 100 may include, for example, various materials such as aluminum, steel, stainless steel, plastic resin, composite (e.g., plastic resin over-molded onto a substrate of different material, or other like composites), or the like, or combinations thereof.

Block 304 of FIG. 21 further illustrates that the anti-ligature cap 200 may be manufactured. For example, anti-ligature cap 200 may be cast, machined, or the like, or combinations thereof. In particular embodiments, the anti-ligature cap 200 may be cast, which may reduce the costs associated with creating the anti-ligature features of the anti-ligature cap 200.

FIG. 21 further illustrates in block 306 that the components of the anti-ligature hinge 200 may be shipped separately or at least partially pre-assembled. For example, the anti-ligature hinge 200 may be at least partially pre-assembled by operatively coupling a first leaf to a second leaf by assembling one or more hinge pins 170 to the plurality of interlocking knuckles 134, 154 of the first leaf 130 and the second leaf 150. The anti-ligature cap 200 may be pre-assembled (e.g., fully assembled) or may be sent at least partially unassembled to allow the anti-ligature hinge 100 to be assembled on site based on the door being a right hand swinging, left hand swinging, inward swinging, and/or outward swinging door 10.

Block 308 of FIG. 18 further illustrates that an installer operatively couples the first leaf 130 to the second leaf 150 through the use of the hinge pin 170, if the anti-ligature hinge 100 is not pre-assembled into the assembled leaf portion 102. The installer may then operatively couple the anti-ligature cap 200 to the leaf portion 102 of the anti-ligature hinge 100 if it was not at least partially pre-assembled. The installer then operatively couples the first leaf 130 or the second leaf 150 to the door frame 20 and the opposite first leaf 130 or second leaf 150 to the door 10 through the use of connectors. For example, the connectors may be welds, fasteners, crimping, or the like.

FIG. 21 further illustrates in block 310 that an installer operatively couples the anti-ligature cap 200 to the first leaf 130 or the second leaf 150 through the use of one or more connectors, such as by spot welding a knuckle 136, 156 to a knuckle projection 270 and/or spot welding a leaf projection 260 to a first web 134 of a first leaf 130 or a second web 154 of a second leaf 150 (e.g., depending on the installation). In other embodiments, other types of welds (e.g., edge welds, butt welds, or the like), fasteners, or the like may be used as the connector. For example, a fastener may operatively couple a leaf projection 260 to a first web 134 or a second web 154 (e.g., through web apertures thereof, such as holes that may be countersunk, or the like) and/or to the door 10 or door frame 20.

It should be understood that while the present invention is described with respect to continuous barrel and pin anti-ligature hinges, the present invention may also be used in accordance with other types of hinges, such as non-continuous hinges, or the like. Moreover, while the anti-ligature cap 200 is illustrated as being operatively coupled at the upper end 104 of the assembled leaf portion 102, it should be understood that an anti-ligature cap 200 may be operatively coupled to the leaf portion 102 at the bottom end 106.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and should not be interpreted in an idealized or overly formal sense unless expressly so defined herein. Certain terminology is used herein for convenience only and is not to be taken as a limitation on the invention. For example, words such as "top," "bottom," "side," "distal," "proximal," "upper," "lower," "left," "right," "horizontal," "vertical," "upward," "downward", "first", "second", or other like terminology merely describe the configuration shown in the figures. The referenced components may be oriented in an orientation other than that shown in the drawings and the terminology, therefore, should be understood as encompassing such variations unless specified otherwise.

It will be understood that when an element is referred to as "operatively coupled" to another element, the elements can be formed integrally with each other, or may be formed separately and put together. Furthermore, "operatively coupled" can mean the element is directly coupled to the other element, or intervening elements may be present between the elements. Furthermore, "operatively coupled" may mean that the elements are detachable from each other, or that they are permanently operatively coupled together.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. An anti-ligature hinge comprising:
a first leaf;
a second leaf operatively coupled to the first leaf; and
an anti-ligature cap comprising:
a body;
a leaf projection operatively coupled to the body, wherein the leaf projection is configured to extend between the first leaf and the second leaf in a closed hinge position, wherein the leaf projection is configured to be non-movably operatively coupled to the first leaf or the second leaf through a leaf projection connector; and
a knuckle projection operatively coupled to the body or a knuckle recess formed by the body; wherein the knuckle projection or the knuckle recess is configured to be operatively coupled to the first leaf or the second leaf.

2. The anti-ligature hinge of claim 1, wherein the leaf projection connector comprises a weld, a fastener, or a crimped connector.

3. The anti-ligature hinge of claim 1, wherein the first leaf and the second leaf comprise:
a web; and
a plurality of knuckles having apertures therethrough;
wherein a pin operatively couples the first leaf and the second leaf through the plurality of knuckles of the first leaf and the second leaf.

4. The anti-ligature hinge of claim 3, wherein the anti-ligature cap comprises the knuckle projection, and wherein the knuckle projection extends into at least one knuckle of the plurality of knuckles of the first leaf or the second leaf.

5. The anti-ligature hinge of claim 1, wherein the anti-ligature cap comprises the knuckle recess, and wherein the knuckle recess is configured to receive a hinge projection operatively coupled to the first leaf or the second leaf.

6. The anti-ligature hinge of claim 1, wherein the first leaf or the second leaf have an upper end with a notched section.

7. The anti-ligature hinge of claim 6, wherein the notched section comprises a beveled surface that extends from a knuckle of the first leaf or the second leaf and into at least a portion of the upper end of the first leaf or the second leaf.

8. The anti-ligature hinge of claim 7, wherein the beveled surface has an angle from a horizontal plane of an upper door edge that ranges from 10 to 80 degrees, inclusive.

9. The anti-ligature hinge of claim 6, wherein the body of the anti-ligature cap comprises:

a bottom surface;

wherein the knuckle projection extends from the bottom surface of the body or the knuckle recess is formed within the bottom surface of the body; and wherein at least a portion of the bottom surface engages with the notched section.

10. The anti-ligature hinge of claim 1, wherein the body of the anti-ligature cap comprises:

a top surface comprising an exposed portion and a frame portion, wherein the frame portion is located within a door frame when the anti-ligature hinge is installed.

11. The anti-ligature hinge of claim 10, wherein the exposed portion diverges from the frame portion outwardly and downwardly from a horizontal plane of the frame portion.

12. The anti-ligature hinge of claim 11, wherein the exposed portion diverges from the frame portion at an anti-ligature angle from the horizontal plane of the frame portion that ranges from 10 to 80 degrees, inclusive.

13. The anti-ligature hinge of claim 1, wherein the body of the anti-ligature cap comprises:

a first side cap surface; and a second side cap surface;

wherein the first side cap surface is flush with a first outer surface of the first leaf and the second side cap surface is flush with a second outer surface of the second leaf.

14. The anti-ligature hinge of claim 1, wherein the anti-ligature cap is a cast anti-ligature cap.

15. The anti-ligature hinge of claim 1, wherein the anti-ligature hinge is a continuous anti-ligature hinge.

16. A door system comprising:

a door;

a door frame; and an anti-ligature hinge comprising:

a first leaf;

a second leaf operatively coupled to the first leaf; and an anti-ligature cap comprising:

a body;

a leaf projection operatively coupled to the body, the leaf projection extending between the first leaf and the second leaf in a closed hinge position, wherein the leaf projection is non-movably operatively coupled to the first leaf or the second leaf through a leaf projection connector; and a knuckle projection operatively coupled to the body or a knuckle recess formed by the body;

wherein the knuckle projection or the knuckle recess is operatively coupled to the first leaf or the second leaf.

17. The door system of claim 16, wherein the anti-ligature cap comprises the knuckle projection, and wherein the knuckle projection extends into at least one knuckle of a plurality of knuckles of the first leaf or the second leaf.

18. The door system of claim 16, wherein the anti-ligature cap comprises the knuckle recess, and wherein the knuckle projection extends into at least one knuckle of a plurality of knuckles of the first leaf or the second leaf.

19. A method of installing an anti-ligature hinge comprising:

providing an anti-ligature hinge comprising:

a first leaf:

a second leaf operatively coupled to the first leaf; and an anti-ligature cap comprising:

a body;

a leaf projection operatively coupled to the body, wherein the leaf projection is configured to extend between the first leaf and the second leaf in a closed hinge position, wherein the leaf projection is configured to be non-movably operatively coupled to the first leaf or the second leaf through a leaf projection connector; and a knuckle projection operatively coupled to the body or a knuckle recess formed by the body; wherein the knuckle projection or the knuckle recess is configured to be operatively coupled to the first leaf or the second leaf;

assembling one of the first leaf or the second leaf to a door frame;

assembling the other of the first leaf or the second leaf to a door; and assembling the anti-ligature cap to the first leaf or the second leaf through the leaf projection connector.

* * * * *